United States Patent [19]

Voit

[11] Patent Number: 5,696,809

[45] Date of Patent: Dec. 9, 1997

[54] ADVANCED INTELLIGENT NETWORK BASED COMPUTER ARCHITECTURE FOR CONCURRENT DELIVERY OF VOICE AND TEXT DATA USING FAILURE MANAGEMENT SYSTEM

[75] Inventor: Eric A. Voit, Silver Spring, Md.

[73] Assignee: Bell Atlantic Network Services, Inc., Arlington, Va.

[21] Appl. No.: 493,472

[22] Filed: Jun. 22, 1995

[51] Int. Cl.[6] .................. H04M 1/24; H04M 3/08; H04M 3/22; H04M 3/00; H04M 5/00
[52] U.S. Cl. .................. 379/5; 379/9; 379/27; 379/34; 379/265; 379/266; 379/267
[58] Field of Search .................. 379/5, 9, 11, 16, 379/112, 114, 201, 210–212, 265, 266, 267, 10, 15, 133, 113, 115, 207, 230

[56] References Cited

U.S. PATENT DOCUMENTS

| | | |
|---|---|---|
| 4,048,452 | 9/1977 | Oehring et al. |
| 4,660,194 | 4/1987 | Larson et al. ........... 379/5 |
| 4,797,911 | 1/1989 | Szlam et al. ........... 379/67 |
| 4,953,204 | 8/1990 | Cuschleg, Jr. et al. ........... 379/266 |
| 5,153,909 | 10/1992 | Beckle et al. ........... 379/265 |
| 5,185,782 | 2/1993 | Srinivasan ........... 379/67 |
| 5,187,705 | 2/1993 | Mano ........... 379/5 |
| 5,299,259 | 3/1994 | Otto ........... 379/221 |
| 5,299,260 | 3/1994 | Shaio ........... 379/265 |
| 5,311,574 | 5/1994 | Livanos ........... 379/88 |
| 5,426,688 | 6/1995 | Anand ........... 379/5 |
| 5,519,772 | 5/1996 | Akman et al. ........... 379/265 |
| 5,530,744 | 6/1996 | Charalambous et al. ........... 379/265 |
| 5,537,470 | 7/1996 | Lee ........... 379/265 |
| 6,500,710 | 2/1997 | Weisser, Jr. et al. ........... 379/265 |

Primary Examiner—Curtis Kuntz
Assistant Examiner—Binh K. Tieu
Attorney, Agent, or Firm—Lowe, Price, LeBlanc & Becker

[57] ABSTRACT

A system and method for concurrent delivery of voice and text data to a service agent including a failure management system using an advanced intelligent network based information distribution system is provided. The system includes a central office switching system, a network controller, at least one service switching point and at least one service transfer point. The system includes an intelligent peripheral/call server combination, responsively connected to, and disposed between, the network controller and the central office switching system, and external databases responsively connected to the intelligent peripheral/call server combination, storing subscriber specific data associated with each of the subscribers. The IP/call server acquires information from a customer regarding a subject telephone number and destination work center, and determines a proper network controller to route the customer initiated call. The network controller validates a customer entered NPA-NXX, and determines an appropriate central switching office system to route the customer initiated call, and processes a customer record, and requests subscriber specific data from at least one of the external databases. The IP/call server receives and processes the request for the subscriber specific data from the at least one of the external databases. The network controller completes processing of the customer record, and the customer initiated call is transferred to a queue in an appropriate central switching office system. The customer specific data is sent to an agent system via the IP/call server, and the customer initiated call is completed to the agent via the appropriate central office switching system, delivering concurrently voice and data to the agent.

22 Claims, 20 Drawing Sheets

| CUSTOMER ENTERED NPA-NXX | BUSINESS OFFICE MONDAY - FRIDAY 0800-1700 | REPAIR OFFICE MONDAY - FRIDAY 0800-1700 | REPAIR OFFICE OTHER TIMES |
|---|---|---|---|
| 301-774 | 301-712-4246 | 301-543-1666 | 301-954-6060 |
| 301-775 | 301-712-4246 | 301-954-6060 | 301-964-6060 |
| 908-699 | 908-649-7271 | 908-236-7271 | 201-536-7352 |

FIG.15

| | GrpStat | Current Operational Status of ACD Group |
|---|---|---|
| 1 | | |
| 2 | PQsize | Number of Calls in ACD Queue |
| 3 | AgtsLgd | Number of ACD Agents Logged in |
| 4 | AgtsBsy | Number of ACD Agents Active on Calls |
| | OTHER | OTHER INFO MIGHT HELP ESTIMATE WAIT TIME |

FIG. 16

| ACD DN | GrpStat | PQsize | AgtsLgd | AgtsBsy |
|---|---|---|---|---|
| 215-466-1234 | Acceptg | 157 | 25 | 15 |
| 304-545-3456 | Acceptg | 123 | 17 | 12 |
| 703-712-9876 | Overflow | 45 | 10 | 8 |

FIG. 17

| 301-236-1234 | 123456789012 |
|---|---|
| 301-236-1235 | 348750349745 |
| 301-236-1288 | 230489093478 |
| 410-393-4331 | 540985304978 |
| 717-989-2312 | 234303492803 |

FIG. 18

ADVANCED INTELLIGENT NETWORK BASED COMPUTER ARCHITECTURE FOR CONCURRENT DELIVERY OF VOICE AND TEXT DATA USING FAILURE MANAGEMENT SYSTEM

BACKGROUND OF THE INVENTION

1. Technical Field

The present invention relates to the concurrent delivery of voice and text data to a service agent, and more particularly to the concurrent delivery of voice and text data to a service agent including a failure management system using an advanced intelligent network (AIN) based computer architecture.

2. Background of the Related Art

In general, there have been various attempts in the prior art to facilitate interaction between the customer and service agent. For example, U.S. Pat. No. 5,185,782 to Srinivasan discloses an automatic callback arrangement for an automatic call distributing (ACD) system. The automatic callback arrangement collects and stores the telephone number from which a call is incoming, and estimates how long the call will have to hold or wait in a queue before the call is answered. If the hold time exceeds a predetermined maximum, the automatic callback arrangement prompts the caller to choose between holding or receiving a return call at a later time if the caller is a valid account holder.

U.S. Pat. No. 5,153,909 to Beckel et al. relates to a central office based automatic call distributor (ACD) system which provides resource control and call event data processing services for several ACD systems which are served by switching system. The ACD system arrangement includes a switching system having a control processor complex (CPC), a special event and control link processor which performs ACD end use call event data partitioning and ACD end user resource allocation message screening, and one or more management information system processors. The management information system processors perform data processing to derive statistics associated with telephone calls to an ACD. The special event and controlling processor brings resource allocation request messages sent by ACD end-users to control the allocation of ACD resources by determining that the request messages conform to a predetermined format, and by verifying that the end-user making the request is authorized to alter the allocation of resources. This screening of resource allocation methods provides protection and privacy of each ACD end-user's data and resources.

U.S. Pat. No. 4,953,204 to Cuschleg, Jr. et al., relates to a system for queuing calls to a multilocation service provider having a plurality of automatic call distributors (ACDs). If all circuits to the ACDs are unavailable, a call is queued in one of a plurality of queues. One or more of these queues will allow call completion to any ACD service provider as soon as an agent of an ACD becomes available. Cuschleg, Jr. et al. is particularly useful for a large customer which requires multiple teams to respond to the large customer's telephone calls. In Cuschleg, Jr. et al. a first system is used to allocate calls to the different service teams for the multi-team customer, and this first system keeps track of the number of available circuits for each team. The first system also has a queue for holding a call when no circuits are available to any of the multiple customer teams. Calls are then routed to the first available circuit associated with any of the teams in at least two geographically separate locations, rather than being routed to the first available circuit for the particular team which is located in the same geographic location as the originating call. In order to minimize call charges, there is a preference to route calls to the regional office closest to the caller and to use other destinations in a sequence which includes progressively longer distances.

U.S. Pat. No. 4,048,452 to Oehring et al. pertains to a telephone switching arrangement which automatically distributes calls on a plurality of groups of call answering consoles. In the telephone switching arrangement, which may be part of a telephone central office or may be located in a remote location such as a customer's premises, a directory number and queuing register are assigned to each group of call answering consoles. All incoming calls to a directory number having one or more attendant consoles are handled by a single queue. As attendant consoles become available, the calls on the queue will be served on a first-in first-out basis. When an incoming call arrives in the queue, a notation of its arrival time is made and the elapsed time since arrival is checked periodically.

In Oehring et al., two time thresholds or time triggers are established for each queue by the systems' user. A first threshold is referred to as the in-flow trigger. When the holding time of the oldest call in a queue is less than the in-flow trigger, the attendants which are answering the calls are less than fully occupied. A second threshold or trigger is referred to as the out-flow trigger. When the holding time of the oldest call on the queue exceeds the out-flow trigger, all the servers associated with queue are fully occupied and a transfer of some of the work load is desirable. In addition, Oehring et al. provides the ability to distribute work from a queue whose servers are working at a high level of occupancy to servers of another queue working at a lower level of occupancy.

U.S. Pat. No. 5,311,574 to Liranos relates to an automatic customer callback feature for use with an automatic call distribution system. In Liranos, a call is placed from a caller to various agents in a work center. When none of the agents are available, the telephone number of the caller is recorded and the call disconnected. When an agent does become available at a subsequent time, a callback is made from the ACD to the caller and the ACD connects the caller to the available agent.

The automatic callback feature of Liranos is implemented in accordance with the following procedure: A customer initiates a call to one of a plurality of agents in a work center. The telephone number of the customer is received by the ACD system during call initiation, and the ACD system determines whether any of the plurality of agents is available for completing the call. When the ACD systems determines that no agent is available, the ACD queues the received telephone number of the customer and disconnects the call. The ACD also monitors the status of the various agents, and determines when an agent becomes available. When an agent is determined to be available, the ACD places a call to the caller using the queued telephone number and connects the caller to the available agent.

U.S. Pat. No. 5,299,259 to Otto is directed to a system which distributes calls over serving centers of a large customer. In Otto, each automatic call distributor (ACD) has a main queue for storing incoming calls to that ACD, in a group of overflow queues for storing calls rerouted from one of the other ACD sites. Before rerouting a call to an alternate ACD site, the overflow que for that site is checked. If the overflow queue for the alternate site has an excessive number of entries, calls will not be rerouted to that alternate site. In addition, if one of the ACD sites is not appropriately equipped with overflow queues for different sites, the system in Otto permits the ACD site to route its overflow traffic to an ACD site which is designated as a mother node. The mother node can then reroute the calls using the overflow-queues in accordance with the system of Otto.

U.S. Pat. No. 4,797,911 to Szlam relates to relieving operators from dialing, waiting for an answer, and preliminary customer account information. The system provides for on-line, direct updating of the customer account information in the mainframe computer, thereby eliminating the need for consolidation of changes into the customer account file. The most current customer account information is provided to the operator of the terminal monitor.

The Szlam system automatically dials the telephone number of a customer, and ascertains whether the called number is busy, ringing, no answer, out of service, changed, or answered. If the call is answered, the system routes the call to the next available operator and automatically obtains abbreviated customer account information which is sent to the operator terminal. The operator terminal then requests the full customer account information from the mainframe computer via a data controller.

None of the above prior art references, however, address the issue of directing or routing customer calls to the appropriate destination in the first instance. That is, it has been determined that many customer telephone calls are routed to an inappropriate destination as a result of the customer incorrectly determining the work center destination which should be handling the call.

Today there are two processes for customer contact initiation, which to some extent deal with customer calls to an inappropriate work center destination: Non-Auto Attendant Call Delivery Architecture and Auto Attendant Call Delivery Architecture.

For the Non-Auto Attendant Architecture, a customer will look up a telephone number for the Business Office or Repair Bureau, and dial the number. The call (via switching, translations, and an Automatic Call Distributor (ACD)) will be connected to an agent in the office they dialed. This agent must ask for the customer's telephone number, initiate terminal transaction to a computer system which contains the needed customer related data, and await the response from the computer system. While awaiting the response, the agent might ask the customer a few questions in order to determine if the customer has called the correct office. If the customer has not dialed the right location, the agent will try to transfer to customer to the appropriate work center. If the customer has dialed the correct office, the agent-customer contact will continue after the screen of data has been retrieved by the agent. The systems involved in these call flows are illustrated in FIG. 1. According to this architecture, the rerouting of the customer call is strictly manual and very inefficient.

In the Auto Attendant Architecture, prior to a call's connection to a destination ACD, the call will be intercepted by the switch (the call hits an AIN switch trigger when trying to terminate to the ACD). Control of the call is then sent to the AIN Service Control Point (SCP) processor via a Switching Transfer Point (STP). The AIN SCP executes a Call Processing Record (CPR) which allows for two-way interaction with the customer. The CPR is the logic which is executed when the switch requests that AIN assume responsibility for call processing. Based on the results of this customer interaction, the AIN SCP may have the switch route the call to an ACD other than the one which the customer had originally dialed. In other words, the AIN SCP uses customer input to reroute misdirected calls to the appropriate office, e.g., the Business Office or the Repair Bureau. See FIG. 2 for an illustration of the systems involved in these call flows. The routing capabilities according to this architecture are very crude and limited.

Upon analysis of the Non-Auto Attendant and Auto Attendant Architectures, it has been discovered that call control is very dependent on a number of factors including: 1) the information that can be carried to the AIN SCP across the Signaling System 7 (SS7) network via the STP, and 2) the ability of the switch to interpret the instructional messages coming back from the AIN SCP.

While the above described systems perform some form of call re-routing from the customer to the Repair Bureau or Business Office, it has also been discovered that customer calls are not only misdirected between the Business Office and Repair Bureau, but are also often misdirected between different Business Offices and different Repair Bureaus. For example, if a Virginia customer wants repair and incorrectly dials the Baltimore CRSAB, AIN SCP will execute a CPR that will transfer the customer to the Baltimore CRSAB. It has been discovered that what is needed to make the service more effective is a way to acquire enough information from the customer so that AIN SCP knows exactly which center to route the customer call.

It has been further discovered that using the automatic number identifier (ANI) accompanying the incoming call was insufficient information for the AIN SCP to route the call to the proper work center. In particular, it has been discovered that a large percentage of calls originate from telephones other than the one the customer wishes to discuss. Therefore, it was discovered that ANI based screening did not provide adequate customer service.

SUMMARY OF THE INVENTION

It is an object of the present invention to properly route calls received from a customer to an appropriate destination work center.

It is also an object of the present invention to provide the AIN SCP with sufficient information to effectively route a customer initiated call to an appropriate destination, including a destination work center.

It is another object of the present invention to route a customer initiated call to an agent located in a work center while also concurrently therewith, populating a agent screen with customer data.

It is another object of the present invention to automatically route a customer initiated call to the proper work center even if the customer has dialed an incorrect work center.

It is another object of the present invention to provide a failure prevention system to ensure that the customer initiated call is completed to the agent station even if the routing system encounters failures.

The present invention is based, in part, on the discovery that using the automatic number identifier (ANI) accompanying the incoming call was insufficient information for the AIN SCP to route the call to the proper work center. The present invention is therefore based on the discovert that asking the customer to enter the NPA-NXX of the telephone number about which they are calling (or other customer specific telephone number) is very effective in providing the AIN SCP with sufficient information to route the customer initiated call. With this information, the AIN SCP can redirect the call the right work center, even if there are 30 or more centers within a particular state.

It is a further object of the present invention to provide capabilities that will significantly enhance agent—customer interaction. For example, the present invention provides many features to the customer without requiring complex DTMF input (for most calls, all that will be required from the customer is a DTMF entry of a telephone number, and an entry indicating whether they want the Business Office or Repair Bureau).

The present invention provides the following capabilities:

Simultaneous Voice & Data—When a customer calls a Business Office or Repair Bureau, the customer will be routed to the existing AIN Auto Attendant system. The customer will use their DTMF keypad to enter the ten digit Telephone Number (TN) they are calling about, this TN will be used to retrieve a standard customer data screen from either the standard Sales Service Negotiation System (SSNS) or the standard Maintenance Contact Support System (MCSS). The screen of data will be delivered to an agent's work station at the same time the customer voice is connected to the agent's headset. Since the associate will have customer data at call initiation, there will be a major contact time savings for the majority of the calls entering both the Business Office and Repair Bureau.

ACD Queue Status—If a call will be waiting in an Automatic Call Distributor (ACD) queue for more than a certain predetermined amount of time, AIN SCP will announce to the caller the expected hold time before a representative becomes available. If desired by the work center, there will also be the capability to allow a customer to route their call to voice mail, terminate the call, or wait in queue for an agent.

Cable Cuts—Based on the TN entered by the customer, AIN SCP can check with the standard Loop Maintenance Operation System (LMOS) to see if there has been a cut or trouble identified on their cable. LMOS maintain the current status of cable pairs which are working or defective. AIN SCP can then announce to the customer that a trouble on their line has been previously identified and is currently being worked. AIN SCP can then give the customer the option of terminating the call, or waiting for an agent. This capability will allow many calls to be screened out from repair during a major cable trouble.

Central Office or Interoffice Cable Outage—Based on the customer entered TN, AIN SCP can screen out calls to the Repair Bureau about service troubles related to central offices which are down, or inter-office cables which have been cut. If it is known at the time, AIN SCP could also provide the customer an estimated clearance time.

Agent Busy Situations—If an ACD queue is full, AIN SCP will ask the customer to please call back later, or (if this capability is desired) route the customer to voice mail in order to allow them to leave call back information.

Routing for Non-Payment—If a customer attempts to call repair about a trouble on their line, and the TN they entered turns out to be Suspended for Non-Payment (SNP), the call can be automatically transferred to collections during regular collections hours.

Routing Based on Customer Type—Based on the customer entered TN, the capability will exist for calls to be screened and routed based on the class of service stored in the Business Office Operations System (BOSS). This capability could allow calls on certain products (ISDN), or calls from certain types of customers (business), to automatically be routed to a certain group of agents.

Simultaneous Voice and Data for Soft Dial Tone New Connects—Soft Dial Tone provides restricted POTS service to houses where the previous POTS service has been disconnected. When a customer moves out of their house and disconnects their service, "soft" dial tone is still provided to the home. This "soft" dial tone gives new customers who move into the house the ability to plug their phone into the wall and call 911 or the Business Office. In order to provide Soft Dial Tone service, the existing cable pair facilities must stay connected, and the switch port (otherwise known as Originating Equipment (OE)) must stay activated. It is the OE which will allow Simultaneous Voice and Data for new connect service negotiations which are coming from Soft Dial Tone residences.

The OE will allow for Simultaneous Voice and Data on new connect orders via the following process. When the customer dials the Business Office from a Soft Dial Tone line, the switch will transmit the OE which originated the call to AIN SCP. AIN SCP will pass the OE to the IP/Call Server in order to find the address of the last customer who had service using that OE. With this address, AIN SCP can populate an initial service negotiation screen with several items including: the new customer address, the serving switch, the products available, and other desired demographic information. This data will appear on a representative's screen when the call is connected to the Business Office. All fields of data will be provided to the representative without requiring the customer to input any data via IVR.

Customers calling the Business Office from a Soft Dial Tone phone will now have a portion of their negotiation completed prior to call connection since the representative will not have to go through the sometimes complicated process of determining customer address and serving switch. Also, since the Service Order data will be coming from the downstream provisioning systems, there is little chance that bad address data, inaccurate switch data, or other errors will be placed into the Service Order. These type of errors are common, and currently cause manual work as Service Orders fall out of the provisioning process into the work centers.

Automated Ordering of Custom Calling Features—Since the present invention provides a platform for complex Interactive Voice Response (IVR) sessions, it will be possible to automate some simple Business Office functions. One possible type of negotiation which might be automated is that for additions or changes to Custom Calling features. If a customer were to call a certain number to take advantage of a special custom calling feature offering, they could be lead through an IVR-script which could accept all the necessary input on the services they desire. Provisioning could then proceed based on the customer response. Such an architecture would allow predetermined custom calling services to be ordered without interaction with an agent.

Automated Change of Interexchange Carrier Selection—As identified in the Automated Ordering of Customer Calling Features section above, a platform for complex IVR sessions will exist. If desired, simple Business Office interactions such as changing a customer's pre-subscribed interexchange carrier (IXC) could be provided the call server process. With this capability, customers would interact with an automated script to collect the information necessary to select a new IXC. Provisioning could then proceed as it does currently. The entire negotiation through provisioning process would be accomplished without requiring human interaction.

Repair Automation—The call server process is enhanced to include interfaces to network testing equipment. One possible interface would allow an automated initiation of the Mechanized Loop Test (MLT). Since the call server process has access to a customer entered telephone number, it would be possible to request and retrieve MLT information prior to connection to a Repair Bureau agent. Based on the results received from the MLT, certain calls could be completed without human interaction. An example of such a call is one that has MLT results indicating a cable pair breakage prior to reaching the customer premises. Since such MLT results will almost invariably result in a Repair dispatch, AIN SCP could announce to the customer that a dispatch is being made, provide an estimated clearance time, and create a repair trouble ticket. This is only one example of several possible types of repair trouble ticket automation.

Repeat Trouble Caller Screening—Since some customers call the trouble center frequently when their service is being restored, AIN SCP could automatically tell a customer that their trouble is being worked, and give the expected clearance time if a trouble ticket has been previously taken for that telephone number (note: this would be done prior to connection with an agent). If the estimated clearance time has passed, the call could be expedited and placed at the head of the ACD queue. This would ensure that repeat trouble customers would have a minimal wait time.

The present invention is also advantageously and preferably adapted in conformity with the standard Integrated Information Systems Architecture (IISA). The IISA Architecture provides the following additional benefits:

Shared Corporate Data—The call server process will use existing corporate data contracts to SSNS and future contracts that will be a part of MCSS phase II. This process will use Contract Traders as defined for the implementation of IISA. Target DLBBs include SSNS Customer and those for MCSS phase II.

Network Connectivity—The call server process will use the BAINET network as long as the availability requirements for uptime are met. A contract itemizing performance requirements will be developed prior to deployment.

State-of-the-Art-Processing—This project is IISA compliant, will use contract interfaces, and uses the Standard Operating Environment (SOE) for the Intelligent Network. SOE for AIN SCP is preferably RISC 6000—type processors running the AIX operating environment.

Security and Disaster Recovery—This project will include security and disaster recovery policies which are telecommunications network grade (since the software is intended for use during the processing of actual telephone calls). This configuration is completely redundant to handle the complete loss of all the hardware in a particular physical location without affecting the processing of any future calls.

The present invention provides a call server process to provide the routing functionality and features described above. The call server process will add new capabilities to the Advanced Intelligent Network (AIN) that will result in a mechanized "front end" between customers and service agents in the business and repair offices, as well as other work centers. The general concept of the call server process is to intercept calls coming into the work centers, and interact with the customer via computerized voice response. By executing scripts with the customer on-line, the call server process will provide more sophisticated functions than are currently performed manually by a service agent. This capability will require the call server process to initiate queries to various operating systems (OSs) and associated database where the required data is to be found.

Data extracted from these OSs, along with responses obtained from the customer via DTMF, will determine the proper treatment of a business or repair office call. These changes will improve the perceived quality of service and result in the elimination of many of the defects resulting from customer interaction.

To accomplish the above objectives, the present invention, according to a first embodiment, provides a system and method for concurrent delivery of voice and text or computer data to a service agent including a failure management system using an advanced intelligent network based information distribution system. the system includes a central office switching system connected to communication lines including at least one service switching point for selectively providing switched communications between the communication lines, and a network controller arranged for selectively providing control data to effect land line communications, and arranged separately from the central office switching system. The network controller is preferably connected to the at least one service switching point through at least one service transfer point arranged to convey control data to effect communications. The network controller stores preprogrammed call processing data associated with subscribers who are associated with one of the communication lines connected to the central office switching system, and also stores preprogrammed call processing data associated with subscribers. The system also includes an intelligent peripheral/call server combination, responsively connected to, and disposed between, the network controller and the central office switching system, and external databases responsively connected to the intelligent peripheral/call server combination, storing subscriber specific data associated with each of the subscribers. The network controller determines the appropriate central office switching system to route a customer initiated call, and the IP/call server acquires queue status from the central office switching system and transmits the queue status to the network controller. The network controller requests data to the IP/call server regarding queue status, and the current queue status is played to the customer. The IP/call server extracts the data from at least one of the external databases and arranges for the customer initiated call to be transferred to a queue of the appropriate central office switching system. The IP/call server transmits the subscriber specific data including a customer data screen to a service agent computer system for concurrent delivery with voice. The central office switching system transmits voice data of the customer initiated call to the agent substantially concurrently with the subscriber specific data.

The present invention, according to a second embodiment, provides a system and method for concurrent delivery of voice and text data to a service agent including a failure management system using an advanced intelligent network based information distribution system. The system includes a central office switching system connected to communication lines including at least one service switching point for selectively providing switched communications between the communication lines, and a network controller arranged for selectively providing control data to effect land line communications, and arranged separately from the central office switching system. The network controller is preferably connected to the at least one service switching point through at least one service transfer point arranged to convey control data to effect communications. The network controller stores preprogrammed call processing data associated with subscribers who are associated with one of the communication lines connected to the central office switching system, and also stores preprogrammed call processing data associated with subscribers. The system also includes an intelligent peripheral/call server combination, responsively connected to, and disposed between, the network controller and the central office switching system, and external databases responsively connected to the intelligent peripheral/call server combination, storing subscriber specific data associated with each of the subscribers. The IP/call server acquires information from a customer regarding a subject telephone number and destination work center, and determines a proper network controller to route the customer initiated call. The network controller validates a customer entered NPA-NXX, and determines an appropriate central office switching system to route the customer initiated call, and processes a customer record, and requests subscriber specific data from at least one of the external databases. The IP/call server receives and processes the request for the subscriber specific data from the at least one of the external databases. The network controller completes processing of the customer record, and the customer initiated call is transferred to a queue in an appropriate central switching office system. The customer specific data is sent to an agent system via the IP/call server, and the customer initiated call is completed to the agent via the appropriate central office switching system, delivering substantially concurrently voice and data to the agent.

In a third embodiment, an advanced intelligent network based information distribution and failure recovery management system is provided. the system includes a first central office switching system connected to first communication lines including at least a first service switching point for selectively providing switched communications between the first communication lines, and first and second universal call distributor systems. The system also includes a second central office switching system connected to second communication lines including at least a second service switching point for selectively providing switched communications between the second communication lines, and third and fourth universal call distributor systems. A network controller is provided which is arranged for selectively providing control data to effect land line communications, and is also arranged separately from the first and second central office switching systems. The network controller is connected to the first and second service switching points through at least one service transfer point arranged to convey control data to effect communications. The network controller stores preprogrammed call processing data associated with subscribers who are associated with one of the first and second communication lines connected to the first and second central office switching systems. The network controller further stores preprogrammed call processing data associated with subscribers. The system also includes a first intelligent peripheral (IP)/call server combination, responsively connected to, and disposed between, the network controller and the first central office switching system. The first IP/call server combination comprises first and second groups of channel switching units. The first group of channel switching units are connected to the first universal call distributor and the second group of channel switching units are connected to the third universal call distributor. A second IP/call server combination is provided which is responsively connected to, and disposed between, the network controller and the second central office switching system. The second IP/call server combination comprises third and fourth groups of channel switching units. The third group of channel switching units are connected to the second universal call distributor, and the fourth group of channel switching units are connected to the fourth universal call distributor.

These, together with other objects and advantages which will be subsequently apparent, reside in the details of construction and operation as more fully hereinafter described and claimed, with reference being had to the accompanying drawings forming a part hereof, wherein like numerals refer to like elements throughout.

BRIEF DESCRIPTION OF THE DRAWINGS

FIGS. 15-18 are tabular diagrams illustrating common data stored in the AIN SCP for call routing for the concurrent delivery of voice and text data using a failure management system;

DESCRIPTION OF THE PREFERRED EMBODIMENTS

Figure 1:
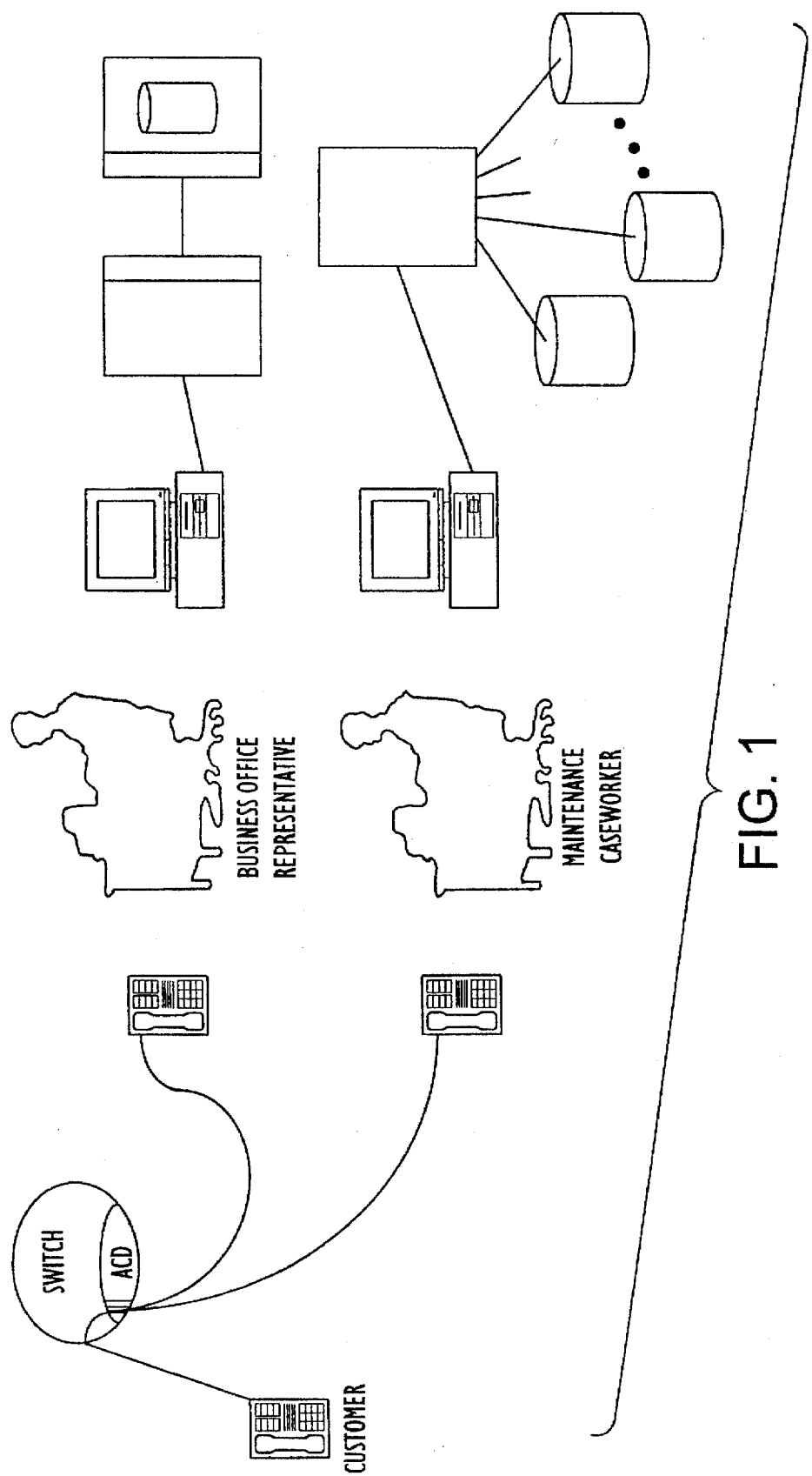
FIG. 1 is a diagram illustrating a manual Non-Auto Attendant Call Delivery Architecture.
Figure 2:
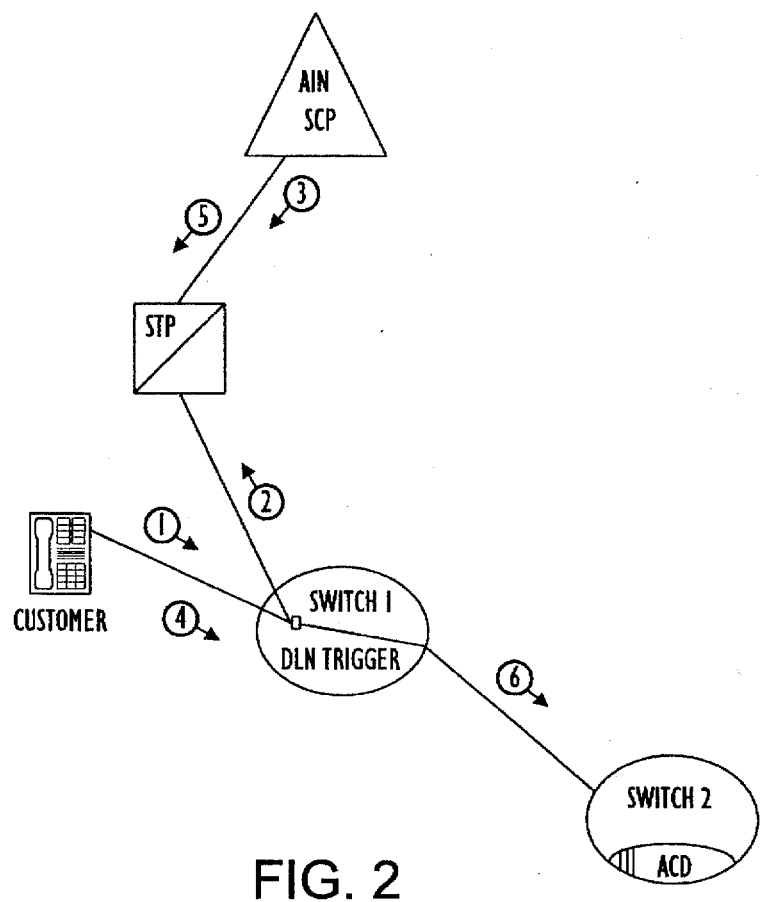
FIG. 2 is a diagram illustrating an Auto Attendant Call Delivery Architecture.
Figure 3:
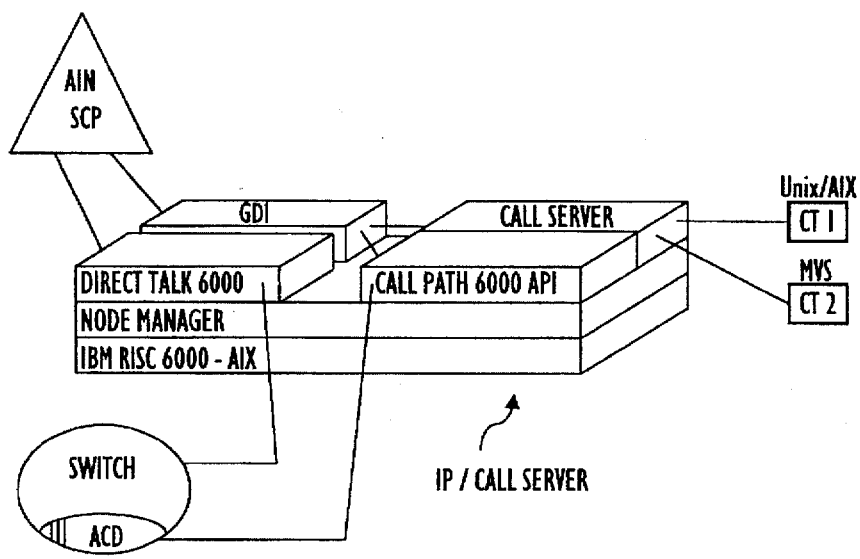
FIG. 3 is a diagram of the hardware and software components and architecture for concurrent delivering of voice and text data using failure management system.

FIG. 3 is a diagram of the hardware and software components and architecture of the present invention. In FIG. 3, the following components which are preferably used in the call server process of the present invention are illustrated:

AIN SCP—Advanced Intelligent Network platform which performs different types of enhanced service processing on calls in the telecommunications network.

Call Path 6000 API—An Application Program Interface (API) which allows for communication between a switch's Automatic Call Distributor (ACD) and programs which reside on an IBM RISC 6000—type computer. The purpose of this API is to provide a standard interface for transfer of data about the status of calls currently waiting in the ACD.

Call Server—Software implemented process which takes requests for data from the AIN platform, formats queries to the appropriate OS, receives the OS query response, and returns the result to the AIN platform. The Call Server, more commonly known as a standard database query server or data query protocal converter also buffers Business Office and Repair Bureau screen data for eventual transmission to an agent.

CT1 & CT2—CT1 and CT2 are Computer Transaction Traders which are part of the corporate data network. The contract traders are responsible for delivering a query to an OS based on some address information provided by the Call Server. The contract traders also return the OS query result to the Call Server. There are two types of Contract Traders which are expected for use by this project. The first one (CT1) will interface with systems residing on Unix type platforms. The second one (CT2) will interface with mainframe MVS type applications.

Direct Talk 6000—An IBM product, or other similar functioning product, will preferably be used to perform Interactive Voice Response (IVR) with a customer while being controlled by the AIN platform.

GDI—The Get Data Interface is an interface which allows AIN to request data from or send data to external systems.

IBM RISC 6000 AIX—The standard hardware and software environment which is generally used for the Advanced Intelligent Network Applications.

Node Manager—A software implemented process which allows for a number of standardized network element control functions to be provided on RISC 6000 software systems. Examples of control functions include: Graphical User Interface display, software process stop/start, performance monitoring, and others.

Switch ACD—An Automatic Call Distributor which controls calls that are waiting in line for available agents in the Business Office and Repair Bureaus.

The operations and interactions of the above components are described in greater detail below.

Figure 4:
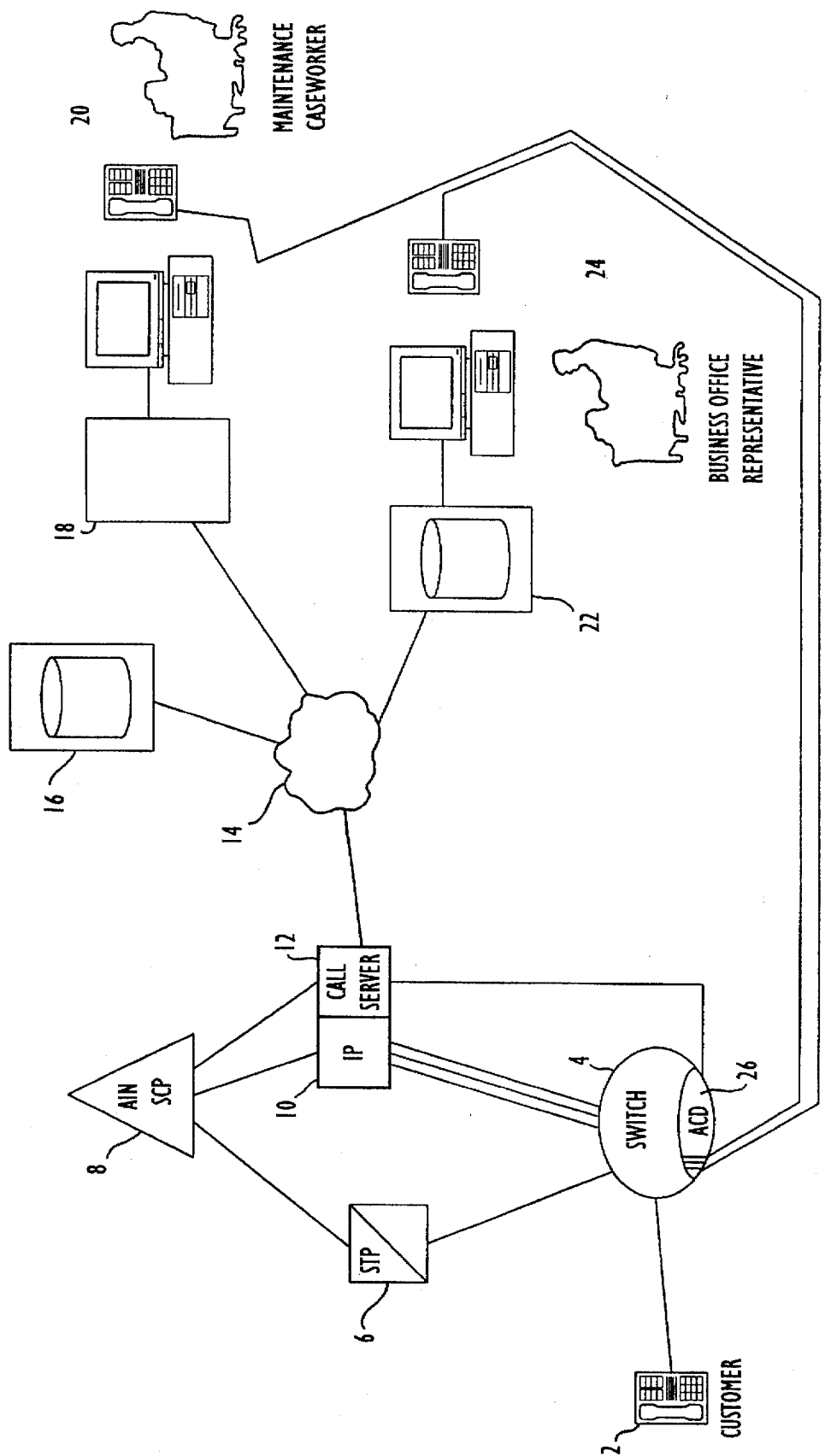
FIG. 4 is a diagram illustrating the basic advanced intelligent network based computer architecture for concurrent delivering of voice and text data.

FIG. 4 is a diagram illustrating the basic advanced intelligent network based computer architecture for concurrent delivering of voice and text or computer data. A brief discussion regarding the basic operations is described below. In FIG. 4, the standard AIN environment has been modified in accordance with the AIN based computer architecture for the concurrent delivery of voice and text (or computer) data including a failure management system. The AIN switching network uses one or more central office switches, such as the class 4/5 Switch, are located throughout a state or region served by a telephone operating company (TELCO). Local telephone lines connect the central office switch to individual telephone terminals in each geographic area, for example to the Plain Old Telephone Service (POTS) phones.

The central office switch connects via trunk circuits to one or more remote central offices. The trunk circuits carry large numbers of telephone calls between central offices and/or between a central office and the mobility controllers. Also, each central office has a Common Channel Inter-Office Signalling (CCIS) type data link going to a Signalling Transfer Point (STP). CCIS type data links provide data communication for standard and related special service processing. Also, a CCIS packet switched data link connects the STP to the Server Control Point (SCP).

In general, a customer initiates a call to the business office or repair bureau. This number which the customer dials has a dialed line number (DLN) trigger set on the receiving switch either at the beginning of the call or after the SCP has identified that the call is to be routed to the business office or repair center. Control of the telephone call is passed to the AIN SCP. The AIN SCP then executes a CPR which asks the receiving switch to play two announcements to the customer. The first announcement greets the customers and asks for the telephone number they wish to discuss. The second announcement asks whether the customer wants the business office or the repair bureau. Upon entering the information, the receiving switch then transmits the customer entered information back to the SCP.

The SCP then determines the appropriate work center and ACD destination. The ACD may reside either on the receiving SSP switch or on a different SSP switch. The SCP also includes in the routing of the call to the appropriate SSP switch a code or number which is for an associated IP/call server or standard voice response unit/database query server. The IP/call server provides for interactive voice response capabilities for more sophisticated interaction with the customer and is associated with the correct ACD and the correct business office or repair bureau. The IP/call server may then access the various databases in the business office or repair bureau before the telephone call is routed to the correct work center, and may determine the estimated queue time before the customer will have access to the agent. In addition, the IP/call server may access the required data in the appropriate operation systems of the work center, and simultaneously display customer related information on the work center monitor with the associated telephone call to the agent. An additional feature may include the rerouting of a customer call from the repair bureau to a standardized message when the call server has accessed the appropriate database and has determined that the customer's line has been inventoried as in need of repair.

A more detailed description of the operations is discussed hereinafter. In FIG. 4, a call which is made to the Business Office 24 or Repair Bureau 20 will go through a step-by-step process to ensure the call is treated and routed appropriately. When a customer makes a call to, for example, the Business Office 24, a trigger in switch 4 will be activated and AIN SCP 8 will be queried via switching transfer point 6. AIN SCP 8 will ask the customer 2, via intelligent peripheral (IP) 10 which preferably includes voice recognition functionality, to use DTMF input or customer voice to enter two items: 1) the telephone number they are calling about and 2) an entry indicating whether they wish to be connected to the Business Office 24 or Repair Bureau 20. With this information, AIN SCP 8 will select the appropriate Business Office to route the call to, and transfer the call to one of the AIN Call Servers 12 operating for that Center. The combination of IP/Call Server may be considered to be a combination of a voice regnition unit (VRU) with a standard signal switching point (SSP) which performs the specific processes and functionality described herein.

When the call reaches the Call Server 12, a check will be made to see if there is room in the ACD queue of the appropriate ACD 26 to handle the call, tell the customer 2 the expected wait time before connection, and initiate a terminal session transaction to network 14 for customer data in one or more databases, for example, customer facilities database 16, recent customer related maintenance database 18 or customer record database 22, depending on the required information. Upon connection of the call to an agent, this screen of customer data will be presented to the agent at the same time the customers voice is connected.

When a customer makes a call to, for example, the Repair Bureau, a process similar to that of the Business Office will be executed including additional functionality as described below. AIN SCP 8 will ask the customer 2 to use DTMF or voice input to enter two items: 1) the telephone number they are calling about and 2) an entry indicating whether they wish to be connected to the Repair Bureau 20 or Business Office 24. With this information, AIN SCP 8 will select the appropriate office to route the call to, and transfer the call to one of the AIN Call Servers 12 operating for that Center. When the call reaches the Call Server 12, several checks will be made: 1) is there room in the ACD queue for the selected ACD 26 to handle the call, 2) is the TN being reported on a cable which has a trouble status, and 3) is the TN being reported suspended for non payment by consulting the necessary databases via network 14, such as customer facilities database 16. Assuming all these checks are passed, AIN SCP 8 will tell the customer the expected wait time before connection, and initiate a terminal session transaction to, for example, maintenance database 22 for customer data. Upon connection of the call to an agent, this screen of data will be presented to the agent at the same time the customers voice is connected.

Figure 5:
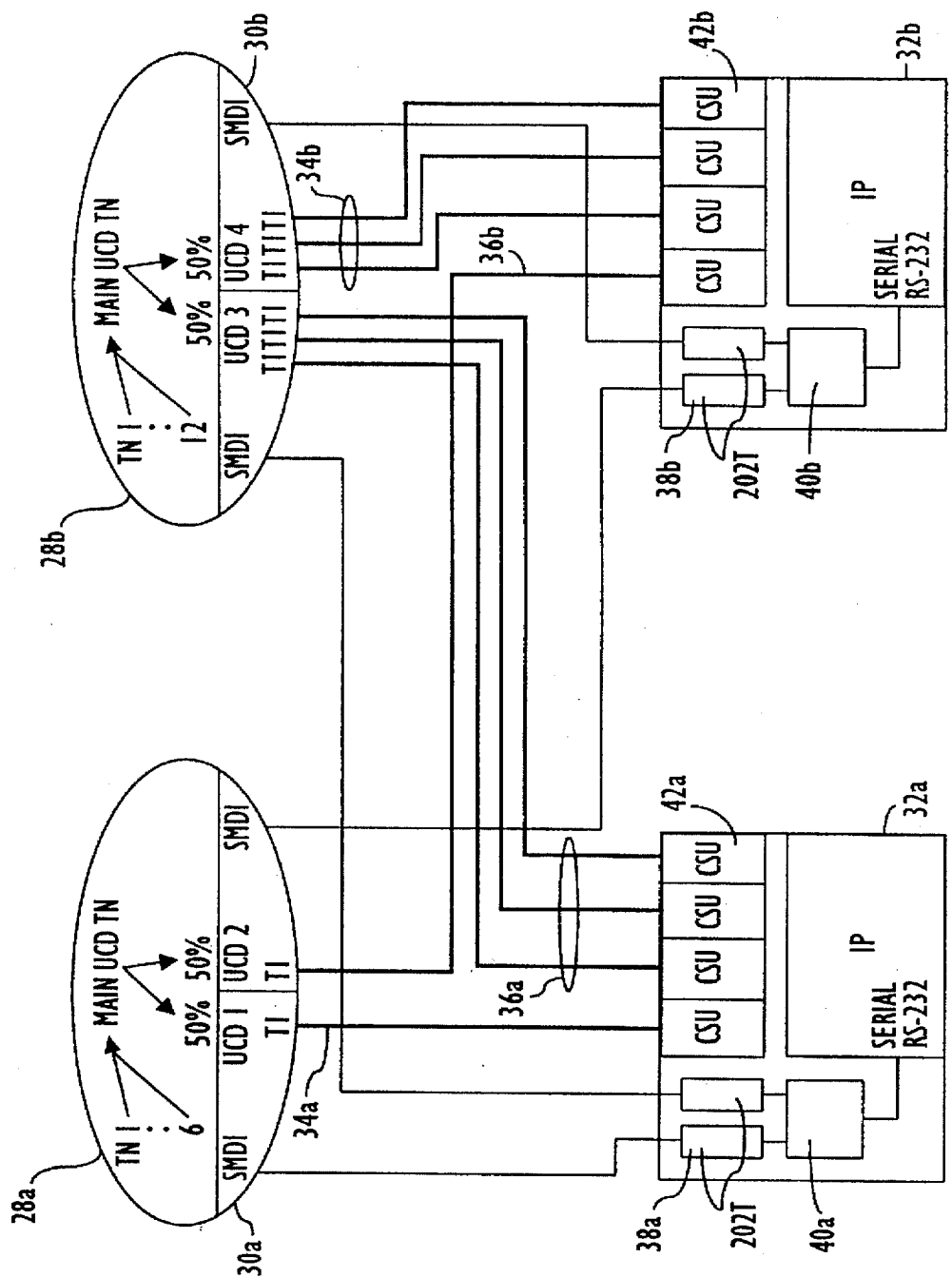
FIG. 5 is a more detailed circuit diagram of one embodiment of the switch and IP/call server configuration providing simultaneous voice and data features and redundancy capability for failures.

FIG. 5 is a more detailed circuit diagram of one embodiment of the switch and IP/call server configuration providing redundancy capability for failures, overload capacity, etc. In FIG. 5, switches 28 and 30 are preferably serving switches for the Business Office and Repair Bureau, respectively. Each include multiple universal call distributors 30a, 30b (UCD) including simplified message desk interface (SMDI) for identifying the line information required by the UCD to receive data from respective channel switching units 42a, 42b (CSU) required connect the call. Other similar functionality as SMDI might be provided such as ISDN type functionality.

Each switch 28a, 28b is normally in communication with respective IP/call server 32a and 32b as illustrated by communication lines 34a and 34b. In addition, additional communication lines are provided in the event of a failure between IP/call server 32a and switch 28b, and between IP/call server 32b and switch 28a via communication lines 36a and 36b, respectively. SMDIs of respective UCDs 30a, 30b communicate with the IP via respective call identification transfer banks 38a, 38b (202T) and standard broadcast data buffers 40a, 40b in the IP/call server units 32a, 32b. Dedicated channel serving units 42a, 42b (CSU) are also provided for transmitting the data required for UCDs 30a, 30b to properly switch the call.

Advantageously, the multiple/duel UCD configuration for each switch, as well as the multiple IP/call server access to each UCD provides the ability to complete a call even if the switch normally associated with the IP/call server cannot be used for failure, over-capacity, etc. Further, the configuration illustrated in FIG. 5 also contains the advantage that only one UCD is dedicated for overflow from a different IP/call server, thereby preventing normal UCD operation from being effected by the failure of a different switch whose associated IP/call server has access to the extra UCD. For example, IP/call server 32a is only able to access UCD 3 in UCD 30b of switch 28b. Similarly, IP/call server 32b is only able to access UCD 2 in UCD 30a of switch 28a.

Figure 6:
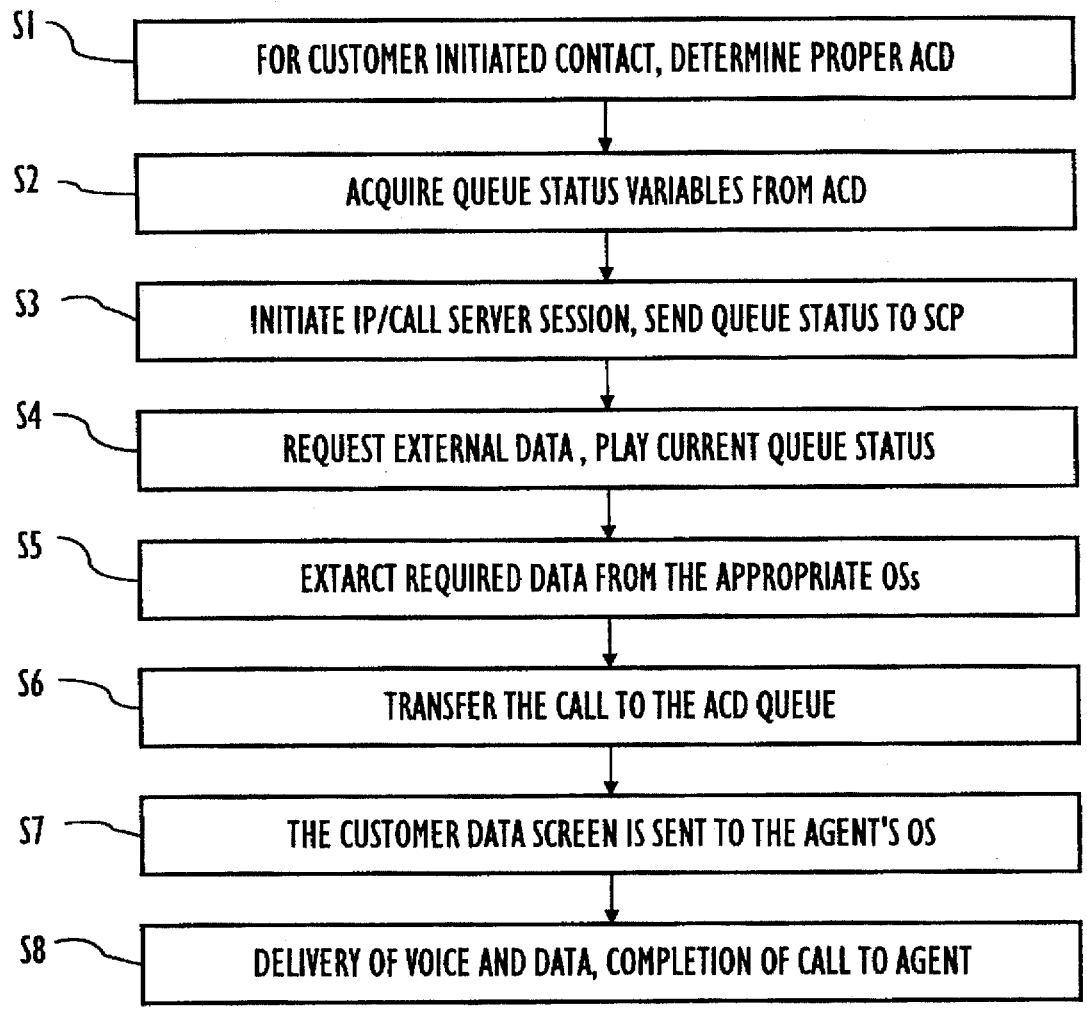
FIG. 6 is a flowchart of the overall process flows in accordance with a first embodiment for concurrent delivering of voice and text data using a failure management system.

FIGS. 6-14 are flowcharts illustrating the process of concurrent delivery of voice and text data to a service agent using the advanced intelligent network (AIN) based computer architecture disclosed herein. FIG. 6 is a flowchart of the overall process flows in accordance with a first embodiment, and FIGS. 7-14 are more detailed flowcharts of the process described in FIG. 6. In FIG. 6, the process steps are implemented to provide the routing features and data delivery features previously described above. The following process steps are implemented in accordance with this embodiment (FIG. 6):

S1: For customer initiated contact, AIN SCP will determine the proper ACD to route the customer call.

S2: Next, the call server will acquire queue status variables from the ACD.

S3: The IP/Call Server session will be initiated and the queue status will be sent to the AIN SCP.

S4: Data will be requested by the AIN SCP to the IP/call server regarding queue status, and the current queue status will be played to the customer.

S5: The required data will then be extracted from the appropriate database systems.

S6: The call will then be transferred to the ACD queue.

S7: The customer data screen is sent to the service agent's computer system for concurrent delivery with voice.

S8: The voice and data are transferred to the agent and the call is thereby completed.

Each of these steps is described in more detail in connection with FIGS. 7-14.

Figure 7:
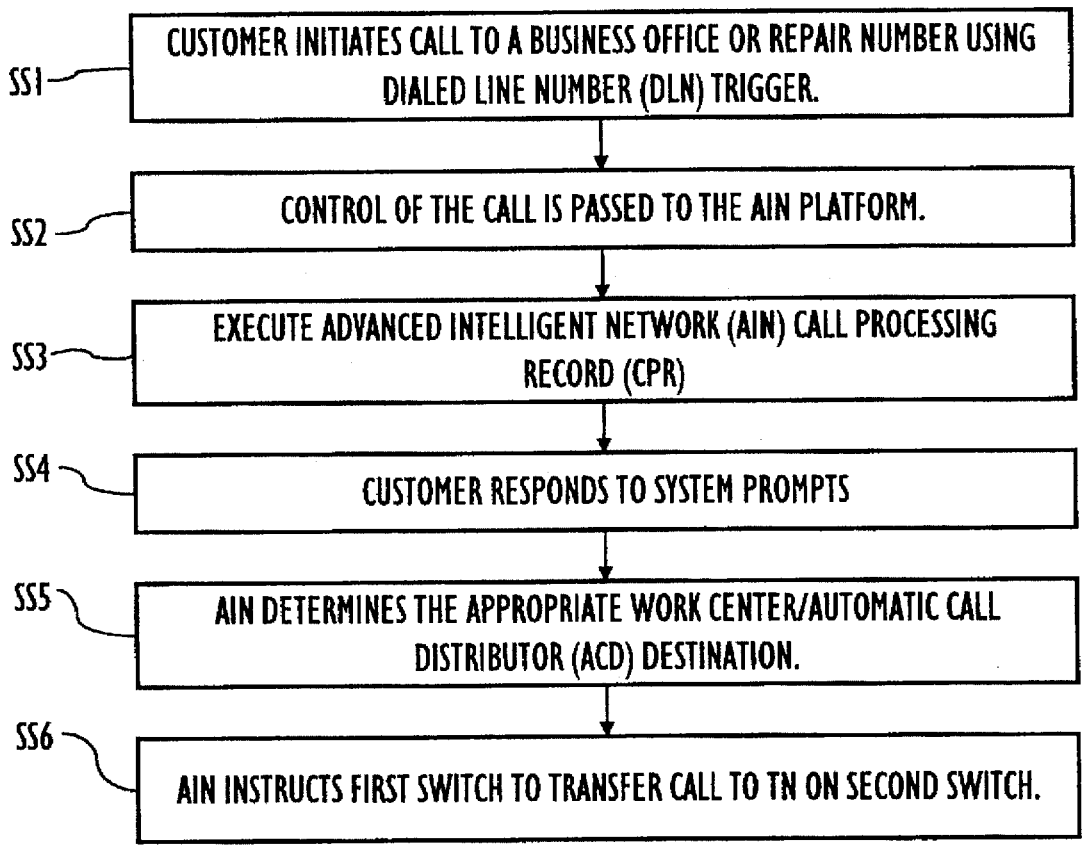
FIGS. 7-14 are more detailed flowcharts of the process described in FIG. 6 for concurrent delivering of voice and text data using a failure management system.

S1: For Customer Initiated Contact, Determine Proper ACD (FIG. 7)

SS1: The Customer initiates a call to a Business Office or Repair number. This number has a Dialed Line Number (DLN) trigger set on a particular switch.

SS2: Control of the call is passed to the AIN platform.

SS3: An AIN CPR is executed which asks the switch to play two announcements to the customer. The first greets the customer and asks for the TN they wish to discuss. The second asks whether they want the Business Office or Repair.

SS4: The customer enters these two items of data via DTMF (the switch collects the digits). The customer entered TN is placed in the CPN field.

SS5: Based on the NPA-NXX of the customer entered TN (or other customer specific TN), AIN determines the appropriate work center/ACD destination. This ACD may reside either on another switch (switch2) or the same switch. See FIG. 15 for an example of tables used to determine the proper work center/ACD destination.

SS6: AIN instructs the first switch to transfer the call to a TN on the second switch. This TN is for the IP/Call Server that serves the correct Business Office or Repair ACD. The IP/Call Server provides for Interactive Voice Response (IVR) capabilities for more sophisticated interaction with the customer.

Figure 8:
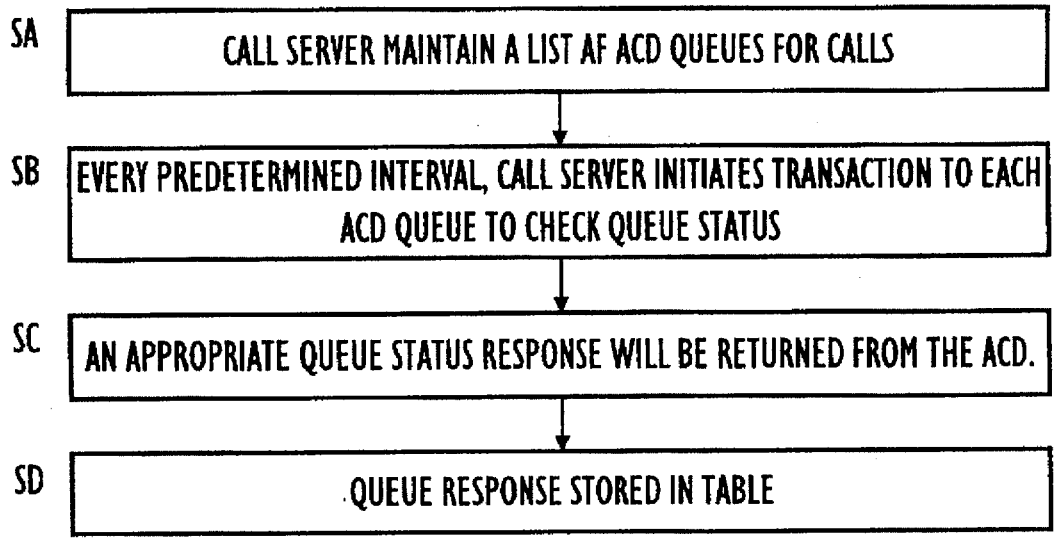

S2: Acquire Queue Status Variables from ACD (FIG. 8)

This process may not be part of every call flow since queue status queries will not be extracted from the ACD during every call. Instead, each ACD queue will be queried once every ten seconds. The status values retrieved from the ACD would be stored as a table (or more likely in IP/Call Server memory) and used as needed by the incoming calls.

SA: The Call Server will maintain a list of ACD queues for which it will handle calls (this list will include time of center operation). Each queue will be identified by its ACD DN (Dialed Number).

SB: Every ten seconds, the Call Server will initiate a transaction to each ACD queue via, for example, a standard Call Path Query_ACD_Information request.

SC: An appropriate queue status response will be returned from the ACD.

SD: This response will be stored in a table keyed by the ACD DN. As queue status information is needed by AIN, table values will be extracted.

Figure 9:
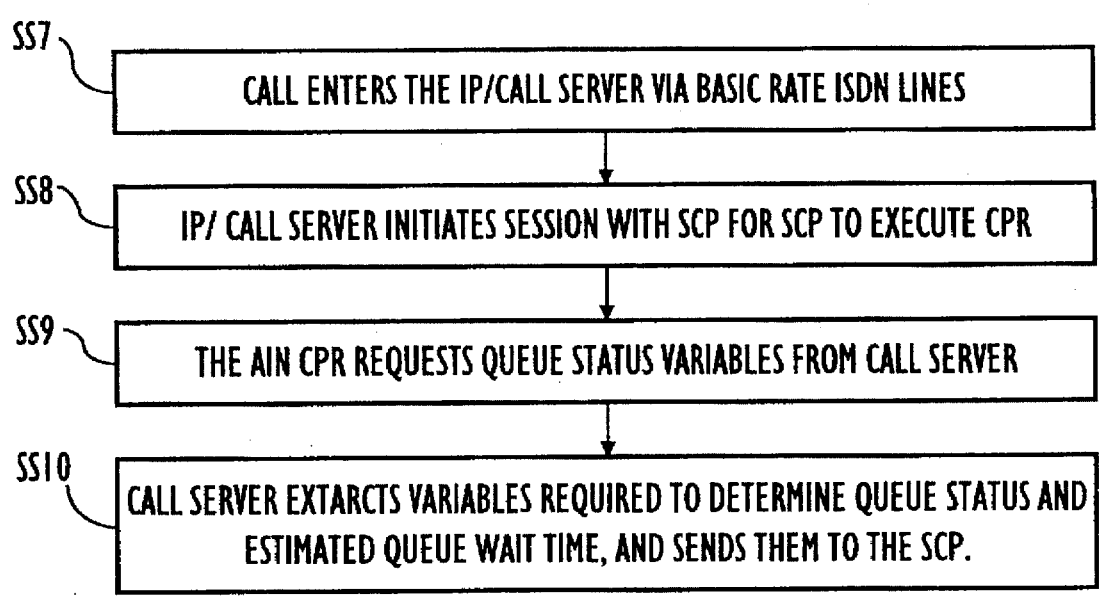

S3: Initiate IP/Call Server Session, Send Queue Status to SCP (FIG. 9)

SS7: The call enters the IP/Call Server via Basic Rate ISDN lines. It is possible that Basic Rate ISDN lines might be needed for several reasons:

Speed; since the transfer is occurring during customer interaction the call would require more time for ringing on the IP if ISDN wasn't used.

Transfer of data; the CPN, DLN, and ANI are three fields which must be transferred from the switch in order for data to be extracted from the OSs.

Call routing capabilities; the call must be able to be transferred from the IP to the ACD queue.

SS8: The IP/Call Server initiates a session with the SCP via a standard 1129+ interface using the associated Provide Instruction transaction. The ACD DN will be passed to the SCP so that the SCP knows which CPR to execute.

SS9: The AIN CPR requests queue status variables from the Call Server through use of the standard getData interface. Some of the status variables required are defined in the tables listed above.

SS10 The Call Server extracts variables required to determine queue status and estimated queue wait time, and sends them to the SCP.

Figure 10:
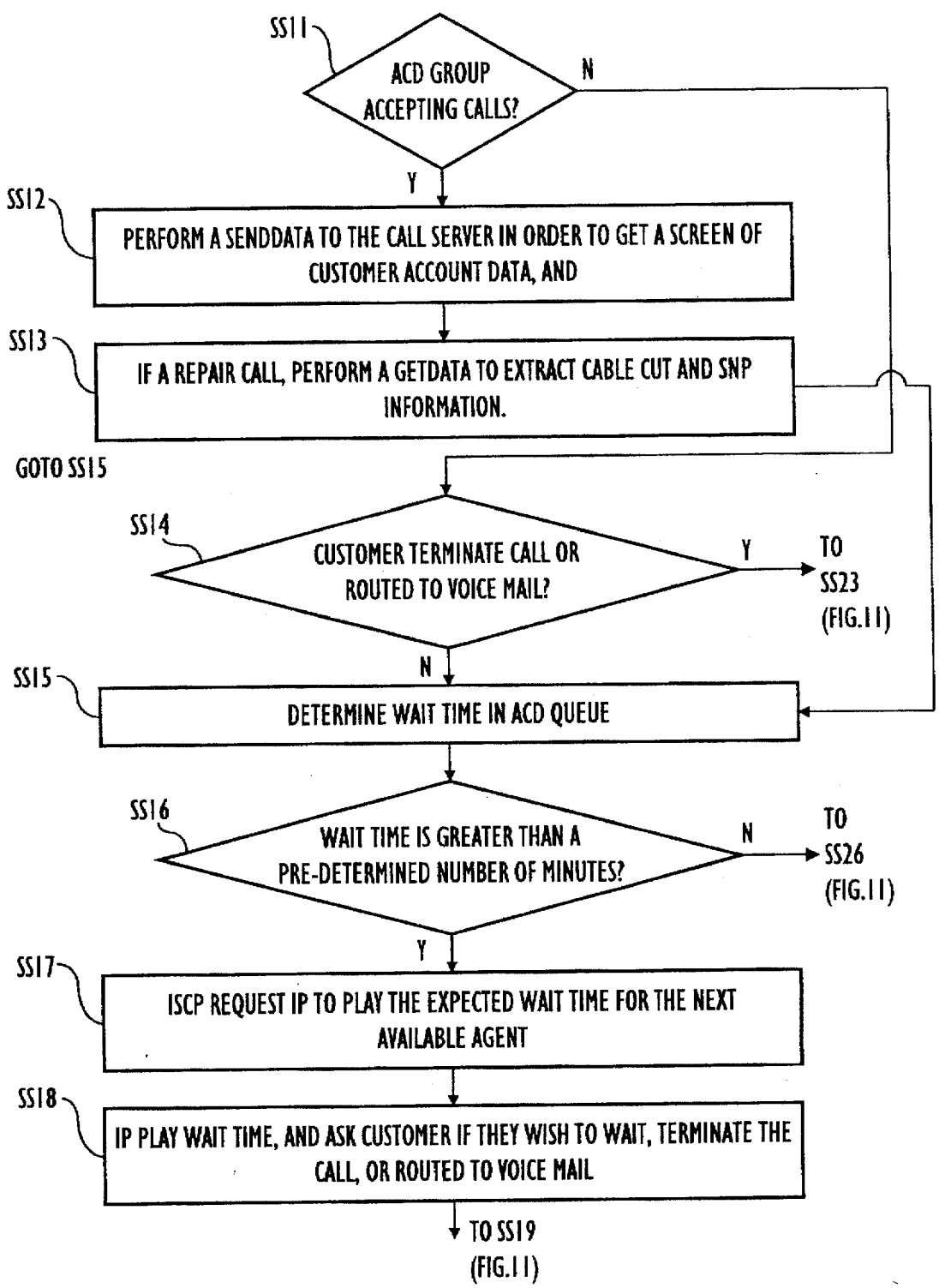
Figure 11:
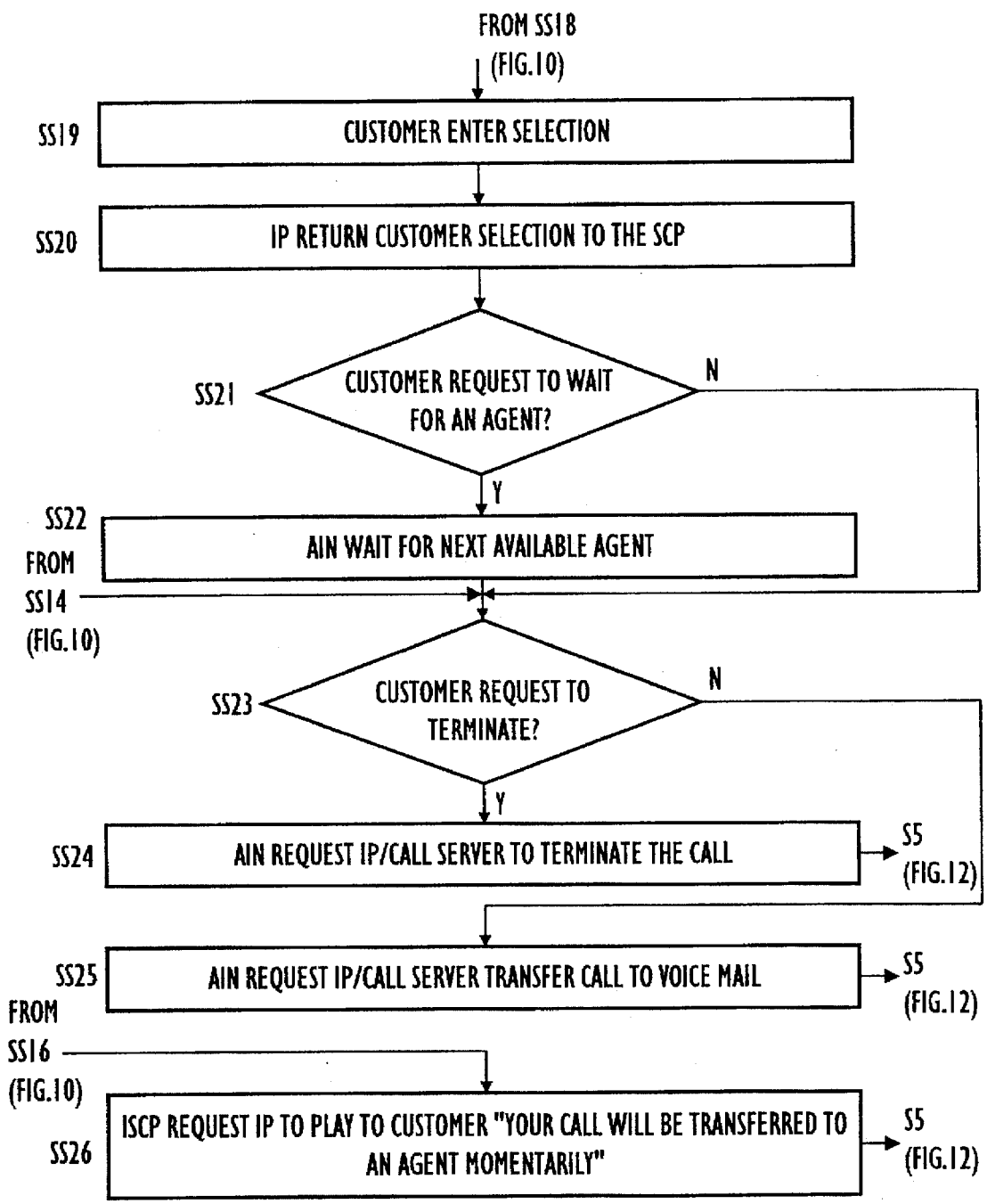

S4: Request External Data, Play Current Queue Status (FIGS. 10–11)

SS11: Determine whether ACD Group accepting calls.

SS12: IF (based on the variables retrieved from the Call Server) the ACD Group is accepting calls, then perform a sendData to the Call Server in order to get a screen of customer account data, and SS13: IF a Repair call, Perform a getData to extract cable cut and SNP information and goto SS15.

SS14: If the ACD Group is not accepting calls, let the customer chose to terminate the call or be routed to voice mail. If the customer wants to terminate the call or be routed to voice mail, goto SS23 described below. If the customer will wait, goto SS15.

SS15: Determine the wait time (if any) which is expected in the ACD queue. See FIG. 17 for a sample table which may be built and consulted by the IP/call server for current ACD status, and FIG. 16 for a sample table which may be used to estimate the wait time in the ACD queue. The wait time can be calculated from the values already returned from the Call Server.

SS16: Determine whether the wait time is greater than a pre-determined number of minutes. If the wait time is not greater than the predetermined time, goto SS26 described below. If the wait time is greater than the predetermined time, then goto SS17.

SS17: The SCP will request the IP to play the expected wait time for the next available agent. The SCP will do this by invoking the standard CallInfoToResource transaction on the 1129+ interface.

SS18: The IP will play the wait time, and ask the customer if they wish to wait, terminate the call, or be routed to voice mail.

SS19: The customer will enter their selection via DTMF.

SS20: The IP will return their selection to the SCP via the CallInfo-FromResource transaction.

SS21: Determine if the customer is to wait for the next available agent. If the customer did not choose to wait, goto SS23. If the customer chose to wait for an agent, then goto SS24.

SS22: AIN will wait for a response from the sendData.

SS23: Determine whether the customer does not want to wait, but wants to terminate. If the customer does not want to terminate, goto SS25. If the customer does want to terminate, goto SS24.

SS24: AIN will request that the IP/Call Server to terminate.

SS25: AIN will request that the IP/Call Server to transfer call to voice mail.

SS26: Play to the customer "your call will be transferred to an agent momentarily", and await a response from send-Data. The IP/call server will, as discussed later, consult FIG. 18 as a sample table for determining which agent will receive the customer call.

Figure 12:
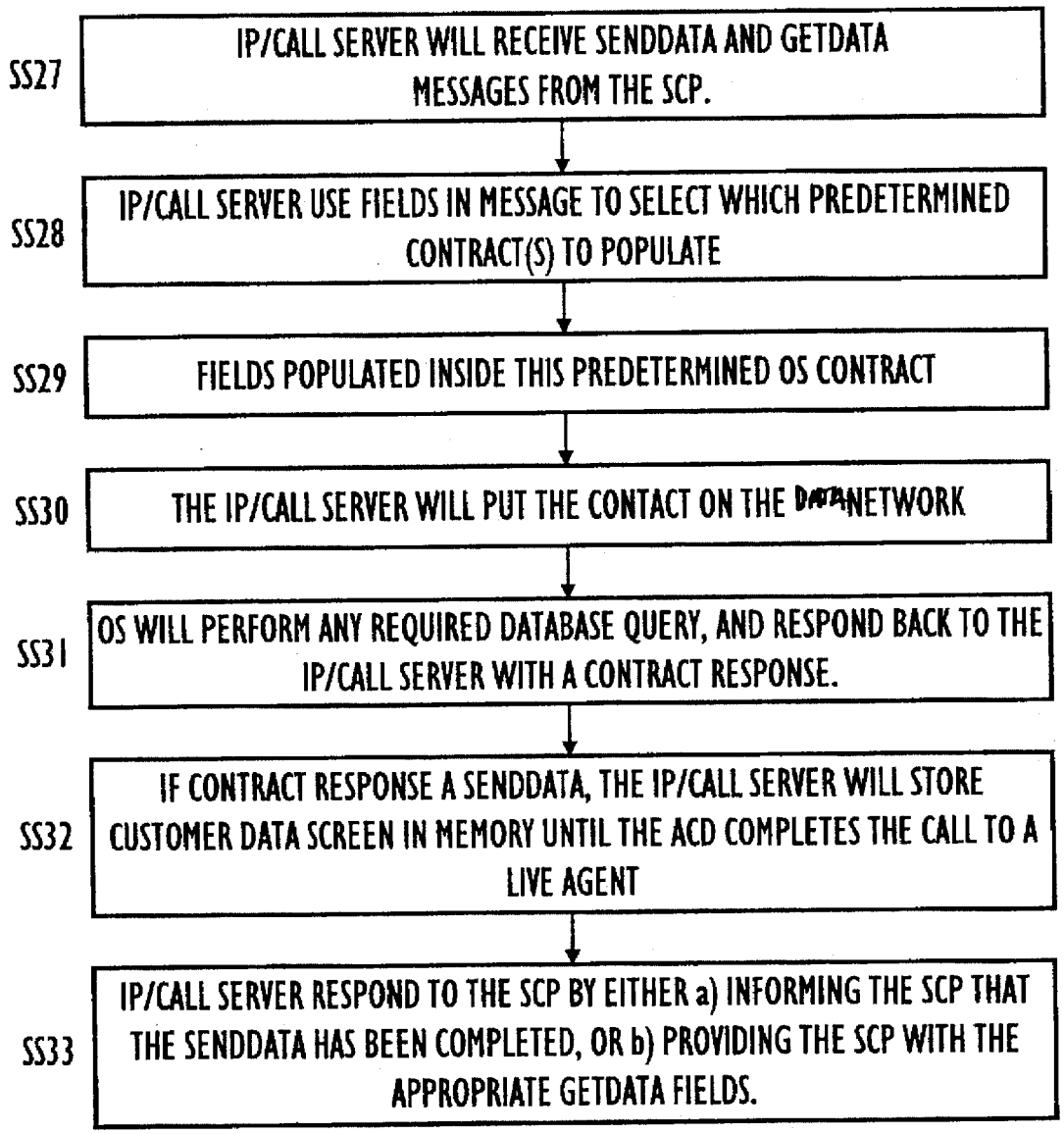

S5: Extract Required Data from Appropriate OSs (FIG. 12)

SS27: As noted previously, the IP/Call Server will receive sendData and getData messages from the SCP.

SS28: For each message received (getData or sendData), the IP/Call Server will use the serviceKey, ACD DN, and/or other fields in the message to select which predetermined contract(s) to populate.

SS29: The fields from the message will be placed inside this predetermined OS contract. The OS contract will be formatted so that when it is received by the OS, it will appear to have been initiated by an end user.

SS30: The IP/Call Server will put the contact on the IISA Network. This network is charged with delivering the contact to the OS.

SS31: The OS will perform any required database query, and respond back to the IP/Call Server with a contract response. For Coordinated Voice & Data, this response will be the one required to populate an agent's workstation.

SS32: If the contract response was for a sendData, the IP/Call Server will store a customer data screen in memory until the ACD completes the call to a live agent.

SS33: The IP/Call Server will respond to the SCP by either a) Informing the SCP that the sendData has been completed, or b) Providing the SCP with the appropriate getData fields.

Figure 13:
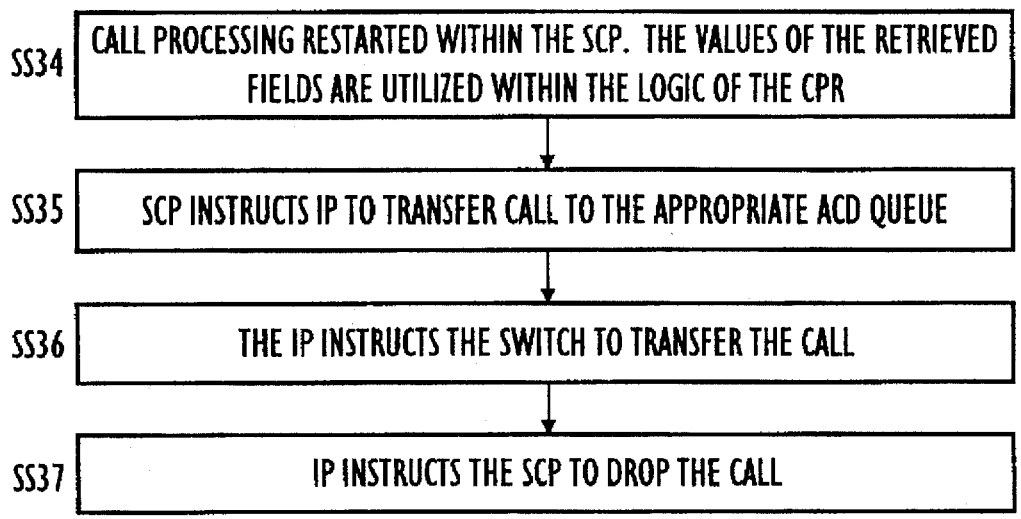

S6: Transfer the Call to the ACD Queue (FIG. 13)

SS34: The SCP receives the response from the IP/Call Server stating that the sendData and getData have successfully been completed. Call processing is restarted within the SCP. The values of the retrieved fields are utilized within the logic of the CPR. Following are two examples of OS field will be usage:

If the call is to repair, the customer is SNPed, and collections is open—route the call to collections.

If the call is to repair, and the customer's cable is statused as in trouble in LMOS, the IP will play a message to their customer that trouble on their line has been identified and will be cleared. The SCP will then ask the customer if they wish to terminate or wait for a caseworker.

SS35: Since the IP/Call Server is now storing the customer data screen, the SCP instructs the IP to have the call transferred to the appropriate ACD queue. The SCP does this by sending a standard SwitchInfoToResource message to the IP.

SS36: The IP instructs the switch to transfer the call.

SS37: The IP instructs the SCP to drop the call by sending both a SwitchInfoFromResource and a ResourceClear message.

Figure 14:
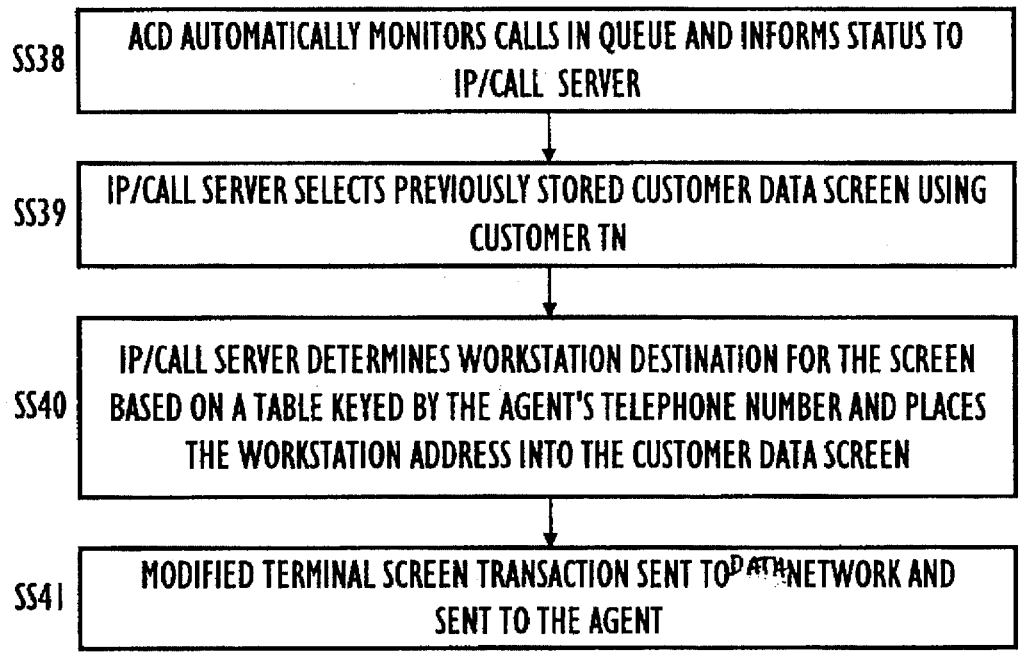

S7: Customer Data Screen is Sent to Agent's OS (FIG. 14)

SS38: The ACD automatically monitors all calls in each queue. As calls are connected to an agent, the ACD sends a standard Call_Routed transaction to the IP/Call Server. This transaction includes the customer entered TN as well as the telephone number of the agent who will work the call.

SS39: The IP/Call Server selects the previously stored customer data screen by using the customer entered TN as a key. Note: The customer entered TN is contained within the ANI of the Call_Routed transaction.

SS40: The IP/Call Server determines the appropriate workstation destination for the screen based on a table keyed by the agent's telephone number. The Call Server then places the workstation address into the customer data screen (this screen is, for example, the SSNS Customer information Transaction Screen, or the MCSS XRMCP001 Screen).

SS41: This modified terminal screen transaction will then be placed back on the IISA network and sent to the agent.

Figure 19:
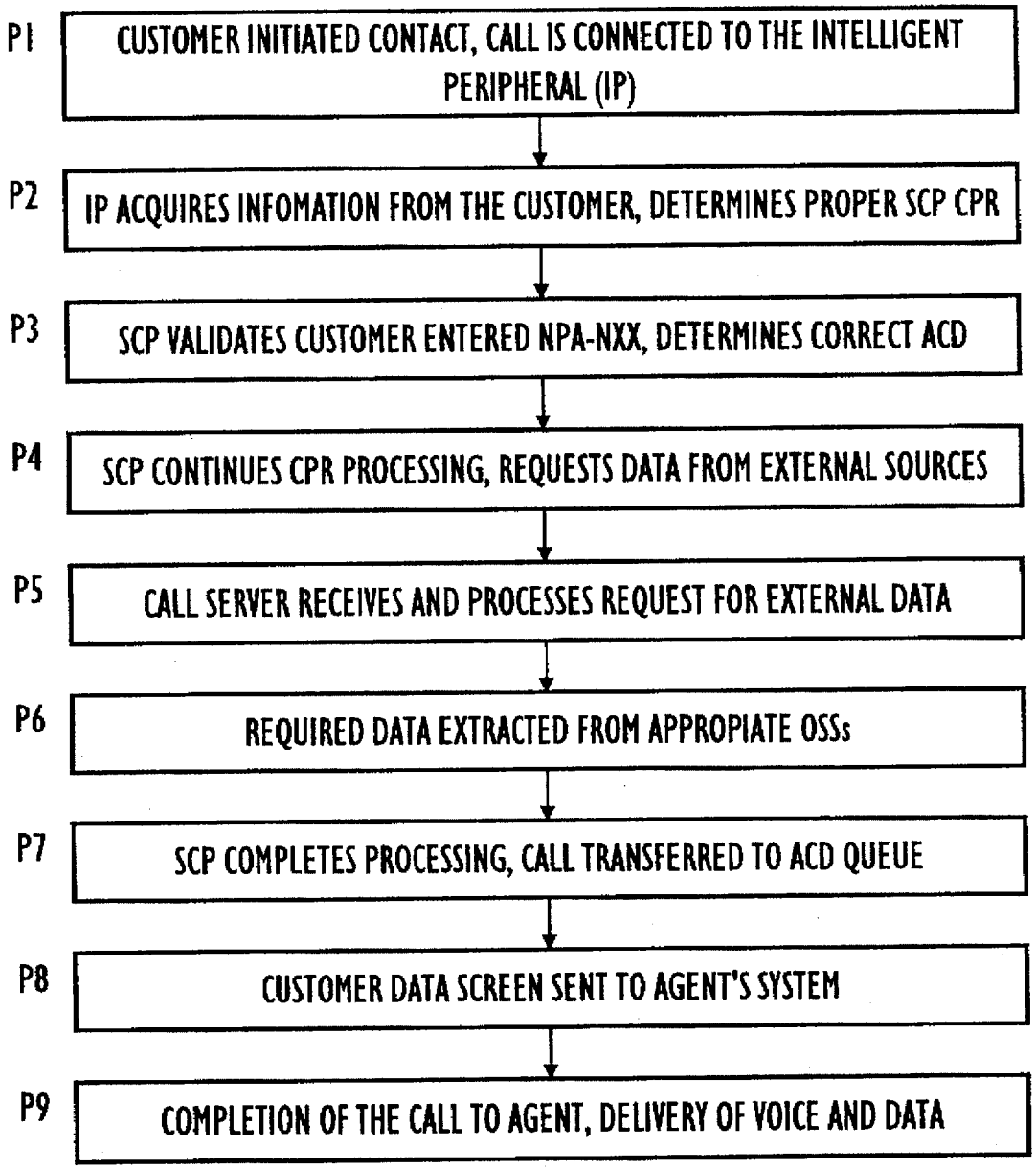
FIG. 19 is a flowchart of the overall process flows in accordance with a second embodiment for concurrent delivering of voice and text data using a failure management system.
Figure 20:
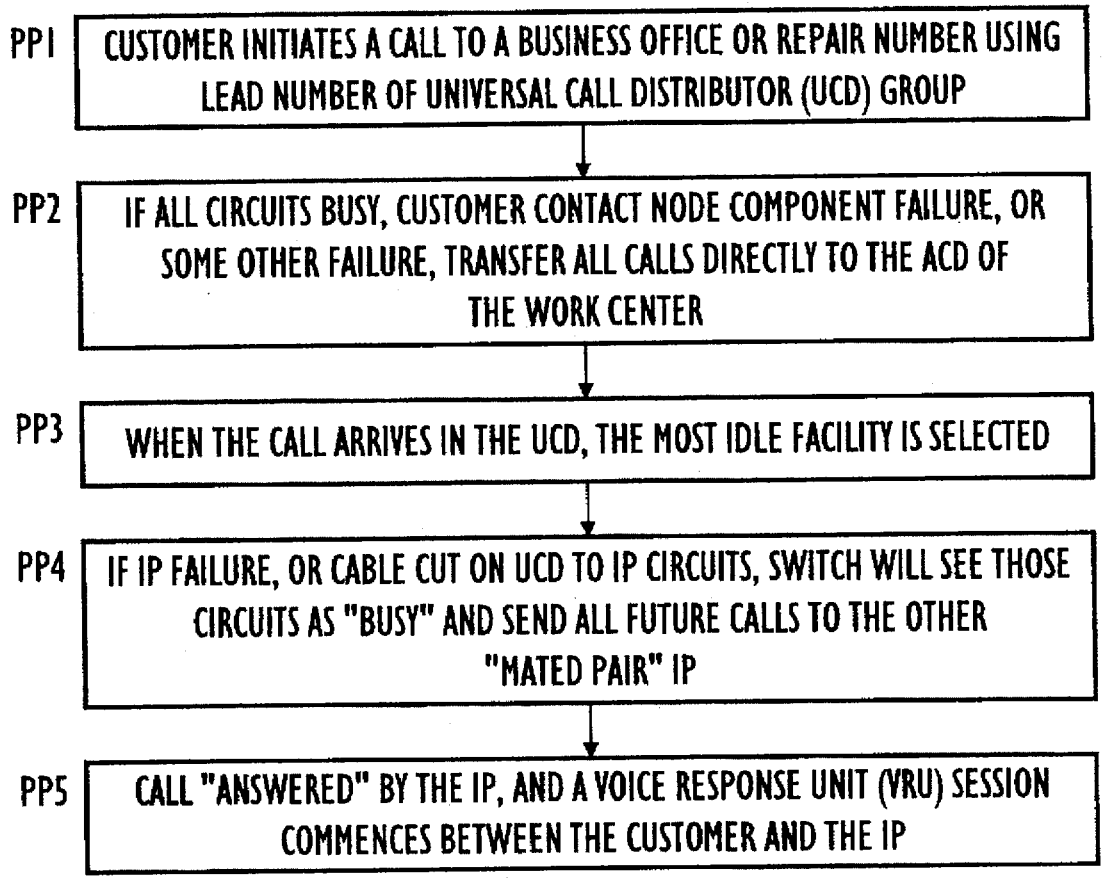
FIGS. 20-27 are more detailed flowcharts of the process described in FIG. 19 for concurrent delivering of voice and text data using a failure management system.

FIGS. 19–27 are flowcharts illustrating the process of concurrent delivery of voice and text data to a service agent using the advanced intelligent network (AIN) based computer architecture disclosed herein. FIG. 19 is a flowchart of the overall process flows in accordance with a second embodiment, and FIGS. 20–27 are more detailed flowcharts of the process described in FIG. 19. In FIG. 19, the process steps are implemented to provide the routing features and data delivery features previously described above. The following process steps are implemented in accordance with this embodiment (FIG. 19):

P1: Customer initiates contact and the call is connected to the Intelligent Peripheral (IP).

P2: The IP acquires information from the customer regarding the telephone number of concern and the destination work center, and also determines proper SCP CPR to handle the routing of the call.

P3: SCP validates customer entered NPA-NXX, and next determines the correct ACD to route the call.

P4: The SCP processes the CPR, and requests any required data from external sources.

P5: The call server receives and processes the request for the external data residing on external storage sources.

P6: The required data is then extracted from appropriate OSs.

P7: The SCP completes the processing of the CPR, and the customer call is transferred to the appropriate ACD queue.

P8: The customer data screen is sent to agent's system.

P9: The call is completed to the agent, and the delivery of voice and data is accomplished.

P1: For Customer Initiated Contact, Call is Connected to the Intelligent Peripheral (IP) (FIG. 19)

PP1: The Customer initiates a call to a Business Office or Repair Bureau. This number will either be the lead number (or be changed via switch translations to be the lead number) of a Universal Call Distributor (UCD) group. Note: A UCD is a Multi Line Hunt Group (MLHG) where the voice facility selected will be the one most idle.

PP2: If for any reason all circuits are busy due to high call volumes, Customer Contact Node component failure, or some other reason, there will be translations on the UCD line to have all calls transferred on Busy/No Answer directly to the ACD of the work center. This is the lowest level of disaster recovery protection.

PP3: When the call arrives in the UCD, the most idle facility is selected. The most idle facility is the voice channel to the Intelligent Peripheral which has not handled a voice call longer than all of the other available channels. Since the UCD has multiple voice channels (T1s) which terminate on physically separate IP computers, load balancing between the computers is accomplished via the call distributor part of the UCD.

PP4: If there are any hardware or software problems in an IP, or if there is a cable cut on the UCD to IP T1 circuits, the switch will see those circuits as "busy" and send all future calls to the other "mated pair" IP.

AIN CCNode architecture preferably has multiple T1 voice links exit from the switch UCD and terminate on physically separate IPs. In addition, if any physical circuit or hardware component goes out of service, the rest of the deployed architecture must be able handle the full traffic volume. Since two T1s (shown above) is preferably the minimum configuration, the deployment architecture should be sized as if only the one IP handled all the call traffic.

PP5: The call is "answered" by the IP, and a Voice Response Unit (VRU) session commences between the customer and the IP. Note: Direct Talk/6000 (DT/6000) is off the shelf IBM software which may be used to drive the IPVRU.

Figure 21:
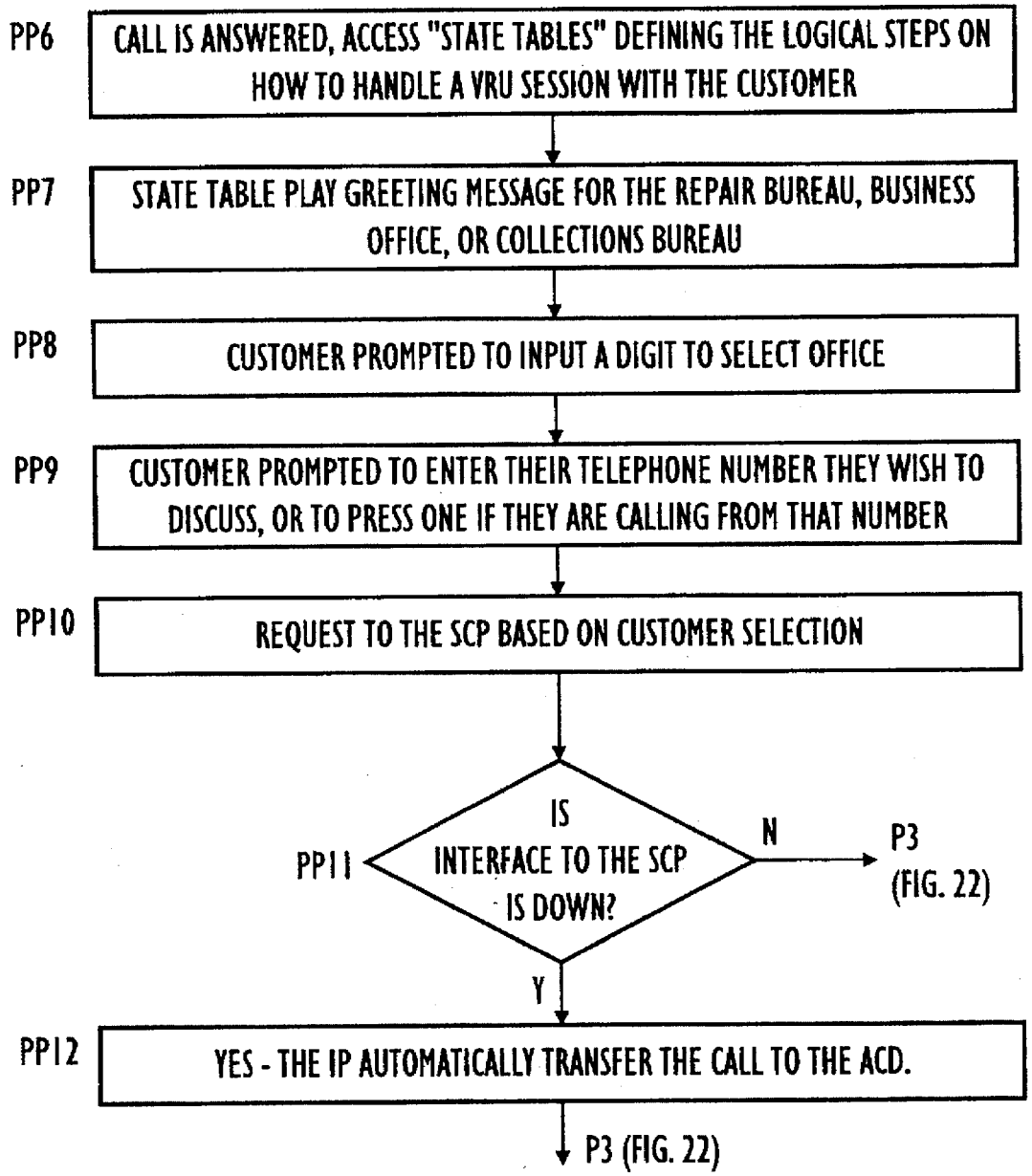

P2: IP Acquires information from the Customer, Determines proper SCP CPR (FIG. 21)

PP6: When a call is answered by DT/6000, "State Tables" within DT/6000 define the logical steps on how to handle a VRU session with the customer. Note: A particular State Table is chosen based on the lead number of the UCD.

The IP preferably includes the DT/6000 mentioned above, and standard 1129+: IP to SCP interface software. This node architecture will allow for the seamless transitions to various IPs to provide additional flexibility.

PP7: A state table will play a greeting message for the Repair Bureau, Business Office, or Collections Bureau, PP8: The customer will then be asked to DTMF input a digit to select which type of office they wish to transfer their call to.

PP9: After the customer has entered this information, the customer will then be asked to enter their telephone number they wish to discuss, or to press one if they are calling from that number.

PP10: Based on the type of office the customer wishes to talk to, DT/6000 will generate standard "Provide instructions" request to the SCP over the 1129+ interface. This request will include:

a) In the called party field, an identifier for which CPR to be run on the SCP. This identifier corresponds to an ipdln trigger number on the SCP.

b) In the calling party field, the customer entered telephone number.

A variety of ipdln trigger numbers can be accessed on the SCP based on information extracted from the customer during the interaction with the Direct Talk State Tables. The trigger numbers will point to CPRs that will process: Customers who have entered both items of DTMF data requested, Customers who have entered no DTMF data, Customers who have only selected the office type which they desire, and repair customers who are able to have an mechanized loop test (MLT) test immediately performed on their line.

Depending on whether the customer is using the telephone line that they are calling about, will depend on the extent of the MLT test that can be conducted since testing for some faults will cause loud static noise on the line which the customer will likely be unable to tolerate. For example, if the customer complains about, for example, call forwarding, this feature can generally be testing while the customer is on the telephone line. The SCP ipdln trigger number will also indicate in reports which telephone number the customer originally dialed.

In addition, the process and computer architecture described herein permits a customer calling a work center which is outside the area of the destination to also perform an MLT as if the work center is located in the area of the destination number. For example, if a caller in Baltimore, Md. has attempted to call a destination in Silver Spring, Md. with no success for an inordinate amount of time, the caller might suspect that the destination telephone number has encountered some type of failure which requires confirmation and repair. The Baltimore caller is prompted for which telephone number they are inquiring, which in this case is the Silver Spring destination number, and then routed to the SCP which handles the work center for the Silver Spring area. This work center is therefore able to perform an MLT test on the Silver Spring telephone line, even though the caller is located in a serving area outside of Silver Spring.

Further, due to the robust and modular design of the process and computer architecture described herein, any caller calling a work center may request that an MLT be initiated. In this connection, the computer process and system also provides telephone operators direct access to automatically initiating MLT tests as well.

P11: Determine whether the interface to the SCP is working. If the interface is not working, goto step P3 which is described in detail in FIG. 22.

PP12: If the 1129+ interface to the SCP is down, the IP will recognize this and automatically transfer the call to the ACD.

Figure 22:
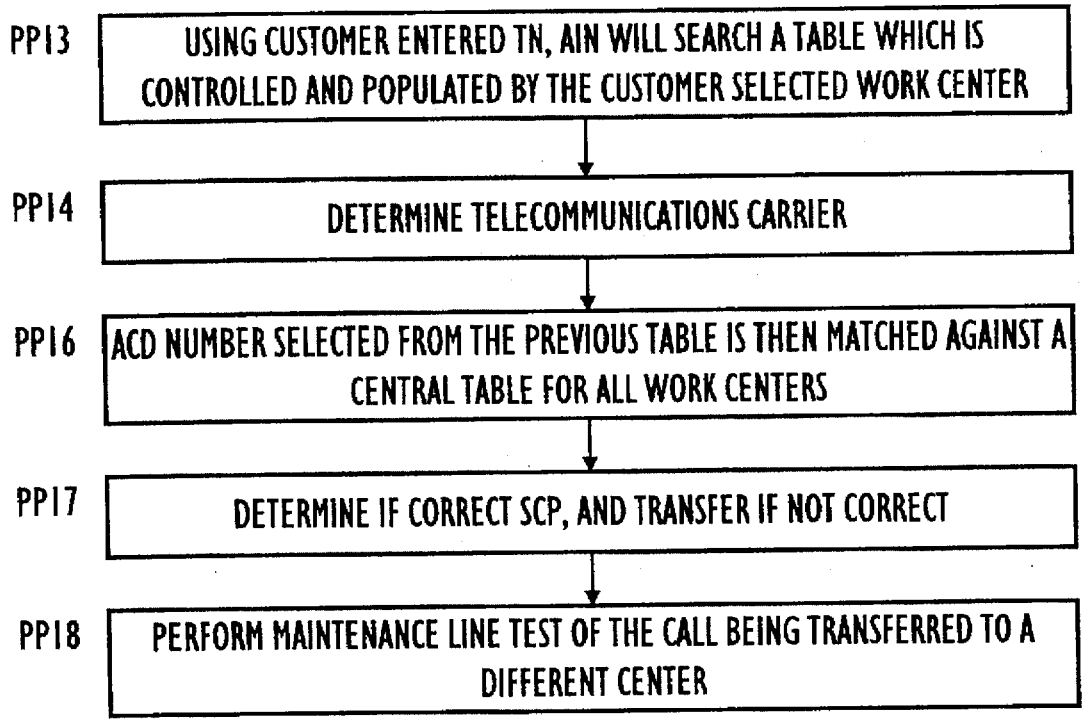

P3: SCP Validates Customer Entered NPA-NXX, Determines Correct ACD (FIG. 22)

PP13: Based on the NPA-NXX of the customer entered TN (or other customer specific TN), AIN will search a table which is controlled and populated by the work center which the customer selected via DTMF. The customer entered NPA-NXX will be within a range of NPA-NXXs, that range of NPA-NXXs to is assigned to a particular ACD number.

PP14: Based on the NPA-NXX, the specific telecommunications carrier is determined. If desired by the work center, NPA-NXX combinations which belong to independent telcos, cellular carriers, or other companies can be identified automatically by checking the "Owner" field. AIN can instruct the IP to play a message indicating the company which the call should be handled. The customer can then press "1" is they wish to be automatically transferred, or they can re-enter their telephone number.

PP16: The ACD number selected from the previous table is then matched against a central table for all work centers. The first thing which is checked in this table is the SCP pair which is responsible for that ACD number. This is very useful because if, for example, a person calls the Baltimore CCNode system and enters an NPA-NXX that is within New Jersey, there is no way for the Baltimore system to get information from the New Jersey databases or ACD queues.

PP17: Determine if the correct SCP is handling the call. If a customer entered number is handled by a different SCP, the call will be transferred to the SCP which handles calls for that center. When calls are transferred out to another IP, the customer entered TN is encoded into the caller identifier so that no information needs to be reacquired from the customer.

PP18: If the call being transferred to a different center can have an MLT performed on the line, the call will be sent to a different telephone number on the foreign IP. The Direct Talk State Table on the foreign IP will know that when a call is transferred into that number, an MLT test can be performed (if desired).

Figure 23:
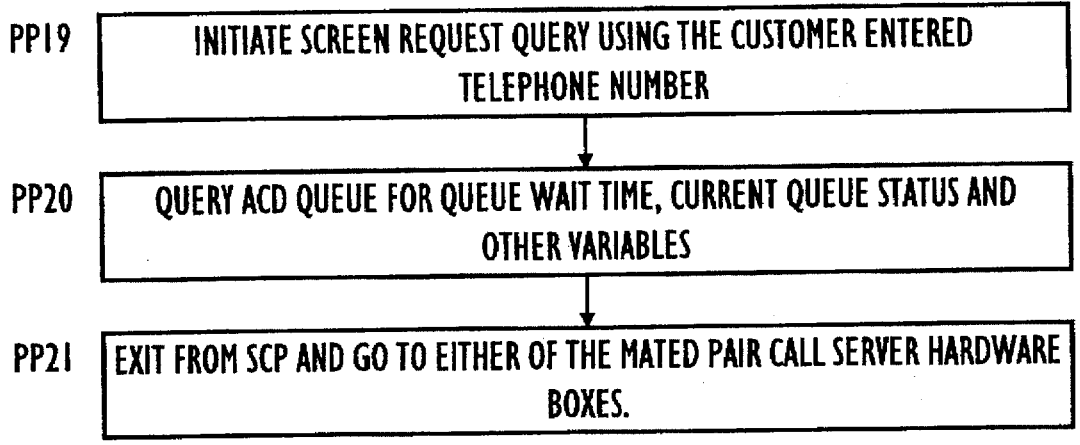
Figure 24:
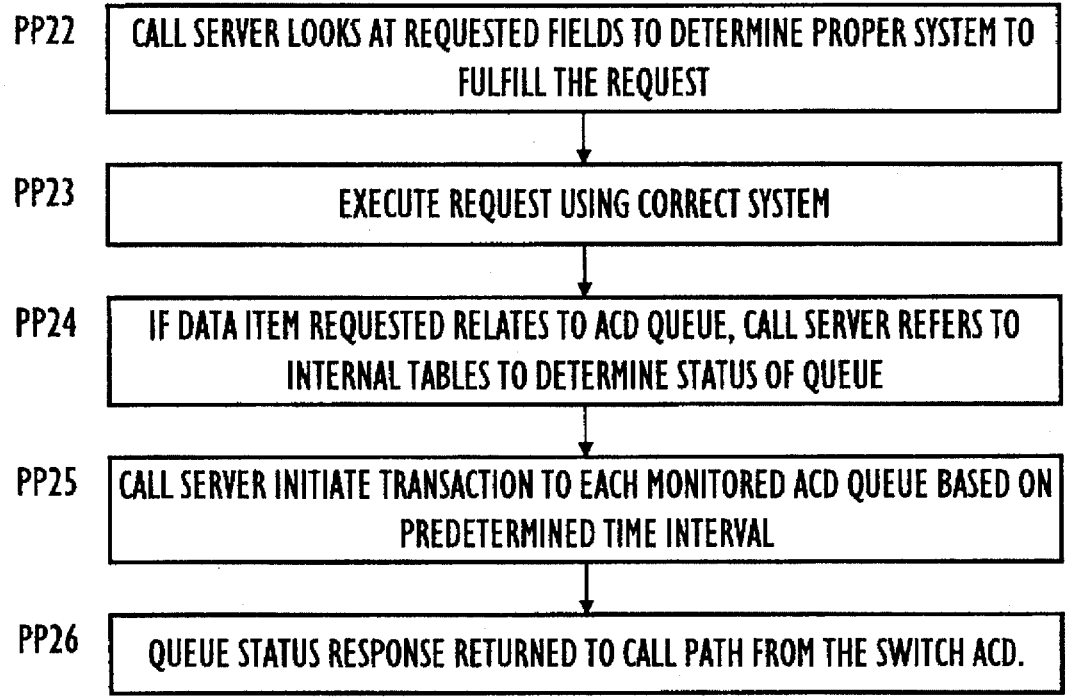

P4: SCP Continues CPR Processing, Requests Data from External Sources (FIG. 23)

PP19: The SCP, after validating that the customer NPA-NXX is handled by that SCP machine, will continue to follow the logic of the CPR. This logic will initiate a get data interface (GDI) screen request query to various external databases such as the business office database BOSS and/or the maintenance database LMOS using the customer entered telephone number.

PP20: The SCP will also initiate a GDI query to the ACD queue to acquire the queue wait time and the current queue status. This second query will use the ACD telephone number extracted from, for example, the standard CCN_ACD_NBR table as its key. The CPR logic might request additional variables via GDI including:

a) Data fields indicating whether the customer TN is Business, Residence, Government, Coin, etc.
b) The Class of Service of the customer TN
c) An data field which shows if the customer TN is denied service for non-payment or Toll restricted
d) An indication if the customer line is currently involved in a cable trouble, and if it is, when it will be fixed
e) Additional queue information such as number of customers waiting, or number of agents active.

PP21: The GDI request will exit from the SCP and go to either of the mated pair Call Server hardware boxes. These are the same physical boxes as those utilized by the IP (see step P2). The SCP evenly distributes queries between the two Call Server boxes.

A local area network, such as SINET, transports the queries between the IP/Call Server box and the SCP. SINET's implementation provides a dual LAN architecture. Also inside the IP/Call Server, there are dual LAN cards—each to a different SINET router. With this architecture, the failure of any single circuit or hardware component will not result in a loss of service.

P5: Call Server Receives and Processes the Request for External Data (FIG.

PP22: The GDI request from the SCP enters the Call Server. The Call Server looks at the fields which have been requested in order to determine which is the proper system to fulfill the request.

P23: Execute request using correct system. If the data item requested is (for example):

a) A BOSS data field—a BOSS data query is formatted and sent directly to the BOSS IMS database via BAINET—local area network.
b) A BOSS screen—a screen match id is generated and stored in the Call Server, but no screen is extracted from BOSS since that function is actually accomplished when the call is completed to an agent.
c) An LMOS screen or data field (including an MLT test)—A Trouble Entry (TE) request is sent to LMOS via BAINET, and a screen match id is generated in the Call Server.

As with SINET, there will be separate set of LAN cards in the Call Server linking to different routers in BAINET. Once again, no single hardware component or circuit failure will result in a loss of service.

PP24: If the data item requested has to do with the ACD queue, then the Call Server looks at its own internal tables to determine the current status of that queue.

PP25: The Call Server will contain a list of ACD queues for which it will maintain internal table data. Each queue will be identified by its ACD telephone number). Every ten seconds (or other user defined interval), the Call Server will initiate a transaction to each monitored ACD queue via Call Path/6000.

PP26: A queue status response will be returned to Call Path from the switch ACD. This response will be stored in a table keyed by the ACD telephone number. Therefore when queue status information is requested by the SCP, the current local table values can be extracted.

There are two reasons the ACD variables are kept locally inside the Call Server. First, it can take up to 10 seconds to extract queue information from the switch. Second, it is not necessary to check the queue wait time on every call since the call wait time does not vary substantially on each call. If one were to check the queue status on each call, it would unnecessarily overload the switch and slow down the Call Server's processing of the customer's call.

There is one primary link to the switch ACD from the Call Server. A backup link (logged-in but inactive) also exists from the mated Call Server to the same ACD. Because of this, at a single point in time only one of the two Call Server boxes can query the ACD for its current status. To resolve this issue, a data replication process (utilizing BAINET)

maintains duplicate ACD data between the Call Server systems. See FIG. 5 regarding the backup system.

Figure 25:
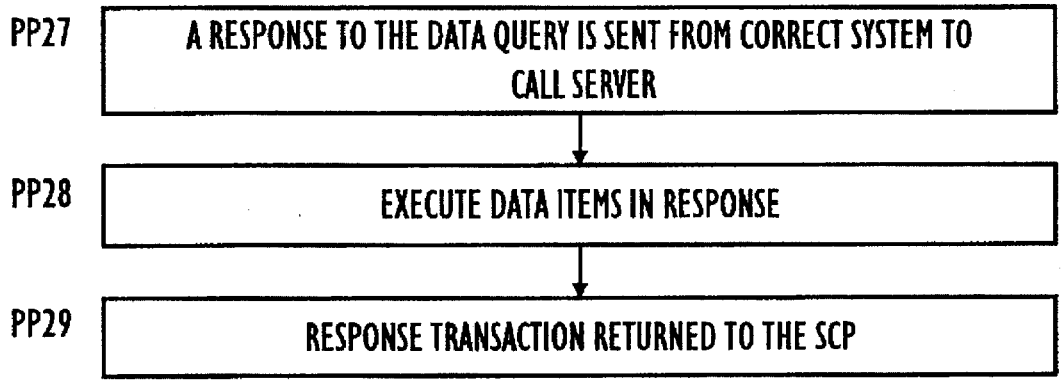

P6: Required Data is Extracted from the Appropriate OSs (FIG. 25)

PP27: A response to the data query is sent from destination system, for example, LMOS and/or BOSS to the Call Server via BAINET.

PP28: Execute the data items in the response. If the data item(s) in the response include:
  a) A BOSS data field—the information in the BOSS response is formatted to be returned to the SCP via a GDI getData response transaction. If requested, a screen match id is also included in the response.
  b) An LMOS screen or data field—An LMOS Trouble Response (TR) screen arrives back from LMOS and is stored in the Call Server. If data fields were requested, they are extracted from the content of the TR screen. These fields are then formatted into a response which is to be sent back to the SCP. Also included in this response is a screen match id.

PP29: The response transaction is returned to the SCP.

Figure 26:
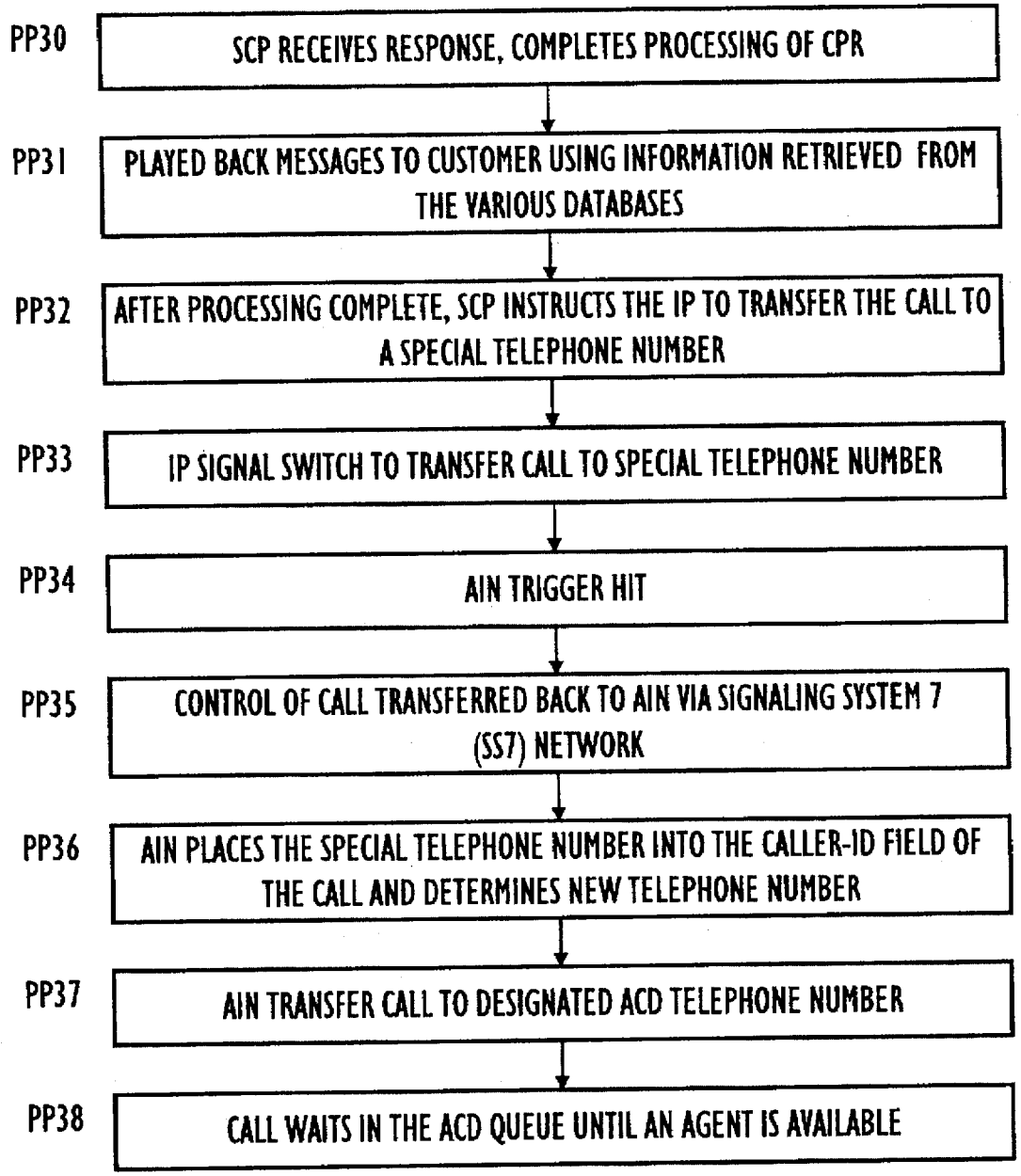

P7: SCP Completes Processing, the Call is Transferred to the ACD Queue (FIG. 26)

PP30: After the SCP receives the GDI responses, it completes its processing of the CPR.

PP31: Messages played back to the customer are as a result of the information retrieved from the various databases. Examples of messages played back include: queue wait time announcement, cable failure detection and trouble clearance time announcement, and others.

PP32: When the interaction with the customer is complete, the SCP instructs the IP to transfer the call to a special telephone number. This telephone number consists two key fields: an NXX which is populated with the ACD number extracted in step 6, and a station number which is populated by the screen match id returned from GDI in step 15. This special telephone number is needed in order to allow for the screen match process. If the call were sent directly to the ACD, the caller-id field would contain the caller-id of the IP. The caller-id of the IP contains no information which could facilitate the screen match.

PP33: Within the IP, DT/6000 uses in-band DTMF on the voice circuit to signal the switch to transfer the call to the special telephone number.

PP34: Within the switch, an AIN 0.1 trigger is hit. This trigger is a Centrex Dialing Plan (CDP) trigger which is set on all telephone lines leaving the IP.

PP35: Control of the call is transferred back to AIN via the Signaling System 7 (SS7) network.

PP36: AIN places the special telephone number into the caller-id field of the call (thus ensuring the screen match id remains as part of the call). AIN then determines a new telephone number for the call by using the ACD number contained in the NXX to query the table CCN_ACD_NBR (which was used in step P7).

PP37: AIN transfers the call to the ACD telephone number extracted from the CCN_ACD_NBR.

PP38: The call then waits in the ACD queue until an agent is available. If the queue is a network ACD queue, and the agent which picks up the call is on a different switch, there will not be any problem due to the BAINET screen data replication process.

Figure 27:
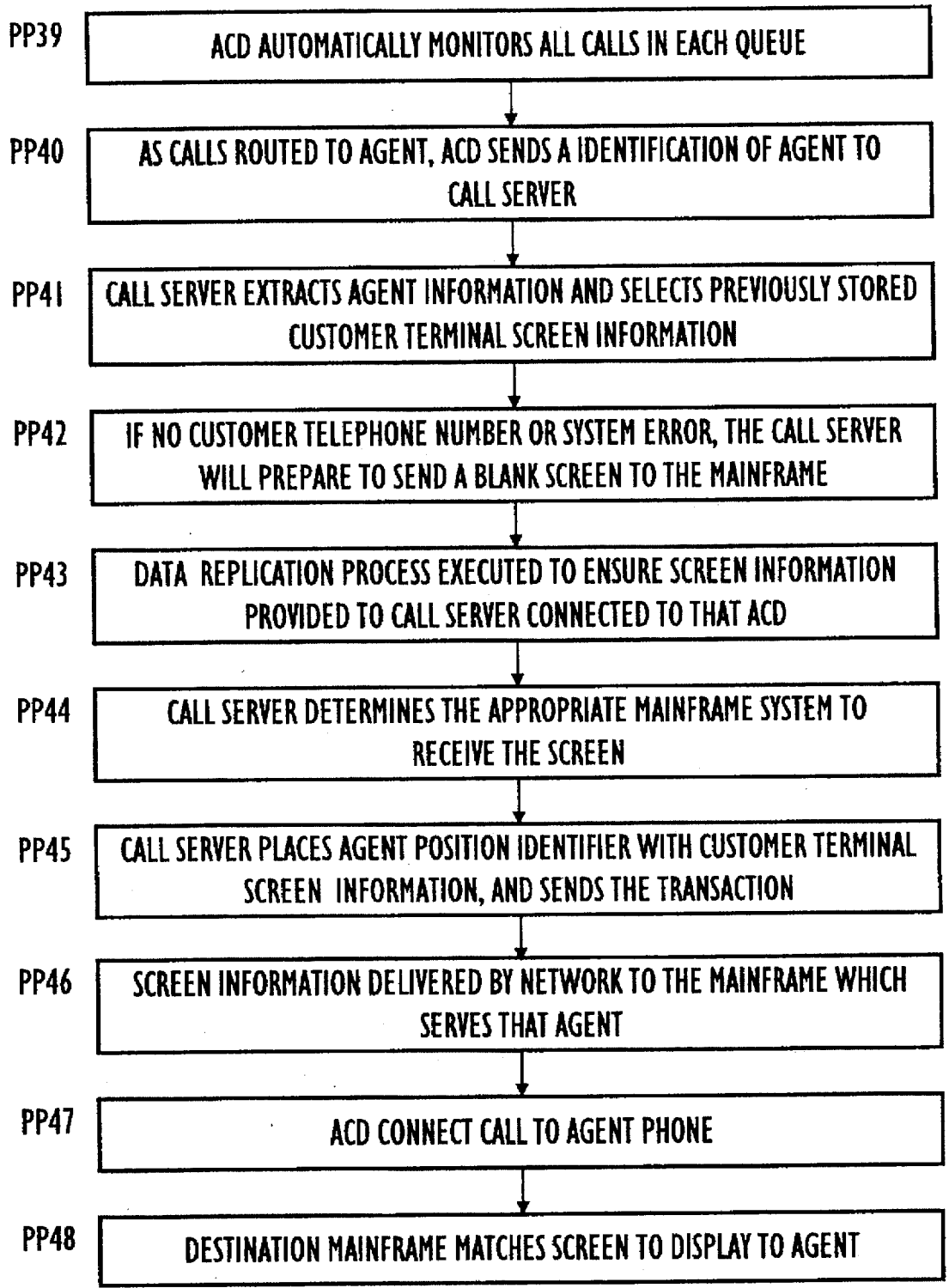

P8 and P9: Customer Data Screen is Sent to the Agent's System—Complete Call (FIG. 27)

PP39: The ACD automatically monitors all calls in each queue.

PP40: As calls are about to be routed to an agent, the ACD sends a Call_Offered transaction to Call Path/6000. This transaction includes the caller-id field as well as the four digit position_id of the agent who will work the call (the position_id is defined within the switch).

PP41: The Call Server extracts the Call_Offered information from Call Path/6000, and selects the previously stored customer terminal screen information by using the call transaction id (the last four digits of the Caller-id field) as a key.

PP42: If the customer never entered a telephone number, or if some system error occurred, the last three digits of the caller_id field will be "999". This indicates to the Call Server that it should send a blank screen to the mainframe instead of a previously stored customer terminal screen.

PP43: Since the Call Server is in a mated pair configuration, and since the customer terminal screen information may have been requested by another the mated computer, a data replication process has been set up to ensure the screen information is provided to the Call Server box which is connected directly to that ACD. This data replication occurs over BAINET (utilizing the same process identified in step 13).

PP44: The Call Server determines the appropriate mainframe system to receive the screen (BOSS or MCSS).

PP45: The Call Server then places the agent position_id into a transaction with the customer terminal screen information, and sends the transaction out to BAINET via the IREP interface.

PP46: The terminal screen information will be carried by network to the mainframe which serves that agent.

PP47: The ACD will connect the customer's call to the phone which sits on an agents desk.

PP48: The destination mainframe systems (e.g., BOSS and MCSS) will receive the transaction, they will then extract the position_id from the transaction and match it to the actual workstation where the agent is sitting. The mainframe system will have the screen of data available to the agent (at the press of a PF key on the agent's keyboard) whenever the agent is ready. The screen will be available to the agent within one second of the call's arrival on their headset.

The reason the screen of data is not automatically displayed on the agent's workstation is that there could be a problem with the new screen overwriting an existing data screen which the agent is currently working on. By making the agent press a key to display the new screen, we eliminate this possibility.

In accordance with the above process and computer architecture, the above system is able to properly route calls received from a customer to an appropriate destination work center. In addition, the system is also able to provide the AIN SCP with sufficient information to effectively route a customer initiated call to an appropriate destination, including a destination work center. The computer architecture is also able to route a customer initiated call to an agent located in a work center while also concurrently therewith, populating a agent screen with customer data. Further, the above computer architecture is able to automatically route a customer initiated call to the proper work center even if the customer has dialed an incorrect work center. The above computer architecture is further able to provide a failure prevention system to ensure that the customer initiated call is completed to the agent station even if the routing system encounters failures.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An advanced intelligent network based information distribution system for concurrent delivery of voice and text data to a service agent including a failure management system, comprising:

a central office switching system connected to communication lines including at least one service switching point for selectively providing switched communications between the communication lines;

a network controller arranged for selectively providing control data to effect land line communications, and arranged separately from the central office switching system, said network controller being connected to said at least one service switching point through at least one service transfer point arranged to convey control data to effect communications, said network controller storing preprogrammed call processing data associated with subscribers who are associated with one of the communication lines connected to the central office switching system, and said network controller further storing preprogrammed call processing data associated with subscribers;

an intelligent peripheral/call server combination, responsively connected to, and disposed between, said network controller and said central office switching system; and external databases responsively connected to said intelligent peripheral/call server combination, storing subscriber specific data associated with each of the subscribers; wherein said network controller determines the appropriate central office switching system to route a customer initiated call, said IP/call server acquires queue status from the central office switching system and transmits the queue status to said network controller, said network controller requests data to said IP/call server regarding queue status, and the current queue status will be played to the customer, said IP/call server extracts the data from at least one of said external databases and arranges for the customer initiated call to be transferred to a queue of said appropriate central office switching system, said IP/call server transmits the subscriber specific data including a customer data screen to a service agent computer system for concurrent delivery with voice, said central office switching system transmits voice data of the customer initiated call to the agent substantially concurrently with the subscriber specific data.

2. An advanced intelligent network based information distribution system according to claim 1, wherein the customer enters customer data via a telephone including customer specific telephone number data, wherein said network controller uses the NPA-NXX data to determine an appropriate destination in accordance with the appropriate central office switching system.

3. An advanced intelligent network based information distribution system according to claim 2, wherein said network controller determines the appropriate destination and the appropriate central switching office even though the appropriate central switching office is different that a subscriber central switching office which receives the subscriber initiated call.

4. An advanced intelligent network based information distribution system according to claim 1, wherein said IP/call server determines whether the central office switching office is accepting calls, said IP/call server executes a data request for obtaining the customer specific data stored in at least one of said external databases.

5. An advanced intelligent network based information distribution system according to claim 1, wherein when the customer initiated call is determined by said network controller to be for repair, and the customer account is overdue, said customer initiated call is automatically routed to collections, and wherein when the customer initiated call is determined by said network controller to be for repair, and an associated customer cable is statused as faulty, a message is played the customer that a trouble has already been identified and will be cleared.

6. In an advanced intelligent network based information distribution system for concurrent delivery of voice and computer data to a service agent including a failure management system, a central office switching system connected to communication lines including at least one service switching point for selectively providing switched communications between the communication lines, a network controller arranged for selectively providing control data to effect land line communications, and arranged separately from the central office switching system, said network controller being arranged to convey control data to effect communications, said network controller storing preprogrammed call processing data associated with subscribers who are associated with one of the communication lines connected to the central office switching system, and said network controller further storing preprogrammed call processing data associated with subscribers, said advanced intelligent network based information distribution system comprising:

an intelligent peripheral/call server combination, responsively connected to, and disposed between, said network controller and said central office switching system;

external databases responsively connected to said intelligent peripheral/call server combination, storing subscriber specific data associated with each of the subscribers;

means for determining the appropriate central office switching system to route a customer initiated call;

means for acquiring queue status from the central office switching system and for transmitting the queue status to said network controller;

means for requesting data to said IP/call server regarding queue status, and for playing the current queue status to the customer;

means for extracting the data from at least one of said external databases and arranging for the customer initiated call to be transferred to a queue of said appropriate central office switching system;

means for transmitting the subscriber specific data including a customer data screen to a service agent computer system for concurrent delivery with voice;

means for transmitting voice data of the customer initiated call to the agent substantially concurrently with the subscriber specific data.

7. A method of concurrent delivery of voice and text data to a service agent including a failure management system, a central office switching system connected to communication lines including at least one service switching point for selectively providing switched communications between the communication lines, a network controller arranged for selectively providing control data to effect land line communications, and arranged separately from the central office switching system, the network controller being connected to the at least one service switching point through at least one service transfer point arranged to convey control data to effect communications, the network controller storing preprogrammed call processing data associated with subscribers who are associated with one of the communication lines connected to the central office switching system, and the network controller further storing preprogrammed call processing data associated with subscribers, said method comprising the steps of:

(a) determining the appropriate central office switching system to route a customer initiated call;

(b) acquiring queue status from the central office switching system and for transmitting the queue status to the network controller;

(c) requesting data to the IP/call server regarding queue status, and for playing the current queue status to the customer;

(d) extracting the data from at least one of the external databases and arranging for the customer initiated call to be transferred to a queue of the appropriate central office switching system;

(e) transmitting the subscriber specific data including a customer data screen to a service agent computer system for concurrent delivery with voice;

(f) transmitting voice data of the customer initiated call to the agent substantially concurrently with the subscriber specific data.

8. An advanced intelligent network based information distribution system for concurrent delivery of voice and text data to a service agent including a failure management system, comprising:

a central office switching system connected to communication lines including at least one service switching point for selectively providing switched communications between the communication lines;

a network controller arranged for selectively providing control data to effect land line communications, and arranged separately from the central office switching system, said network controller arranged to convey control data to effect communications, said network controller storing preprogrammed call processing data associated with subscribers who are associated with one of the communication lines connected to the central office switching system, and said network controller further storing preprogrammed call processing data associated with subscribers;

an intelligent peripheral/call server combination, responsively connected to, and disposed between, said network controller and said central office switching system; and external databases responsively connected to said intelligent peripheral/call server combination, storing subscriber specific data associated with each of the subscribers; wherein said IP/call server acquires information from a customer regarding a subject telephone number and destination work center, and determines a proper network controller to route the customer initiated call, said network controller validates a customer entered telephone number, and determines an appropriate central switching office system to route the customer initiated call, said network controller processes a customer record, and requests subscriber specific data from at least one of said external databases, said IP/call server receives and processes the request for the subscriber specific data from said at least one of said external databases, said network controller completes processing of the customer record, and the customer initiated call is transferred to a queue in an appropriate central switching office system, and the customer specific data is sent to an agent system via said IP/call server, and the customer initiated call is completed to the agent via said appropriate central office switching system, delivering substantially concurrently voice and data to the agent.

9. An advanced intelligent network based information distribution system according to claim 8, wherein when communication lines between said central office switching system and said IP/call server are busy or have encountered failures, said central office switching system forwards the customer initiated call directly to the appropriate central office switching system related to the destination work center.

10. An advanced intelligent network based information distribution system according to claim 8, wherein said IP/call server comprises redundant first and second call handling systems, and wherein when said first call handling system of said IP/call server experiences at least one of hardware and software failures, or when communication lines between said first call handling system and said central office switching system experiences a failure, said central office switching system transmits future calls to said second call handling system.

11. An advanced intelligent network based information distribution system according to claim 10, wherein multiple T1 voice links connect said central office switching system to said IP/call server.

12. An advanced intelligent network based information distribution system according to claim 11, wherein each said first and second call handling systems include capacity to handle call traffic for all calls received by said central office switching system.

13. An advanced intelligent network based information distribution system according to claim 8, wherein the customer is requested to indicate whether the customer initiated call concerning a telephone line is the same telephone line being used for the customer initiated call, and wherein a mechanized loop test is performed on the telephone line responsive to an answer provided by said customer.

14. An advanced intelligent network based information distribution system according to claim 8, wherein an automatic number identifier is collected by said central office switching system relating to a telephone line being used for the customer initiated call, wherein the customer entered telephone number is compared to the automatic number identifier to determine a match, and wherein a mechanized loop test is performed on the telephone line responsive to whether the match is detected.

15. An advanced intelligent network based information distribution system according to claim 14, wherein the advance intelligent network based information distribution system provides the customer calling the destination work center from a location not administered by the destination work center to request a mechanized loop test be performed on a destination location of the customer initiated call.

16. An advanced intelligent network based information distribution system according to claim 14, wherein the advance intelligent network based information distribution system provides external service operators to request a mechanized loop test be performed on a destination location of the customer initiated call to the operator.

17. An advanced intelligent network based information distribution system according to claim 8,
wherein based on the customer entered NPA-NXX, he network controller will search a table controlled by the destination work center designated by the customer, and
wherein a range of NPA-NXXs to is assigned to a particular central office switching system for routing the customer initiated call.

18. An advanced intelligent network based information distribution system according to claim 17,
wherein said IP/call server stores queue information locally to minimize time required to obtain the queue information from said central office switching system, and
wherein said IP/call server does not obtain the queue information from said central office switching system for every call when the queue information does not substantially vary for each call.

19. In an advanced intelligent network based information distribution system for concurrent delivery of voice and text data to a service agent including a failure management system, including a central office switching system connected to communication lines including at least one service switching point for selectively providing switched communications between the communication lines, a network controller arranged for selectively providing control data to effect land line communications, and arranged separately from the central office switching system, said network controller being connected to said at least one service switching point through at least one service transfer point arranged to convey control data to effect communications, said network controller storing preprogrammed call processing data associated with subscribers who are associated with one of the communication lines connected to the central office switching system, and said network controller further storing preprogrammed call processing data associated with subscribers, an intelligent peripheral/call server combination, responsively connected to, and disposed between, said network controller and said central office switching system, and external databases responsively connected to said intelligent peripheral/call server combination, storing subscriber specific data associated with each of the subscribers, a method comprising the steps of:
(a) acquiring information from a customer regarding a subject telephone number and destination work center, and determines a proper network controller to route the customer initiated call;
(b) validating a customer entered NPA-NXX, and determining an appropriate central switching office system to route the customer initiated call;
(c) processing a customer record, and requesting subscriber specific data from at least one of said external databases;
(d) receiving and processing the request for the subscriber specific data from said at least one of said external databases;
(e) completing the processing of the customer record, and transferring the customer initiated call to a queue in an appropriate central switching office system; and
(f) transmitting the customer specific data to an agent system, and completing the customer initiated call to the agent via the appropriate central office switching system, delivering substantially concurrently voice and data to the agent.

20. An advanced intelligent network based information distribution and failure recovery management system, comprising:
a first central office switching system connected to first communication lines for selectively providing switched communications between the first communication lines, and first and second universal call distributor systems;
a second central office switching system connected to second communication lines for selectively providing switched communications between the second communication lines, and third and fourth universal call distributor systems;
a network controller arranged for selectively providing control data to effect land line communications, and arranged separately from said first and second central office switching systems, said network controller arranged to convey control data to effect communications, said network controller storing preprogrammed call processing data associated with subscribers who are associated with one of the first and second communication lines connected to said first and second central office switching systems, and said network controller further storing preprogrammed call processing data associated with subscribers;
a first intelligent peripheral (IP)/call server combination, responsively connected to, and disposed between, said network controller and said first central office switching system, said first IP/call server combination comprising first and second groups of channel switching units, the first group of channel switching units connected to the first universal call distributor and the second group of channel switching units connected to the third universal call distributor;
a second IP/call server combination, responsively connected to, and disposed between, said network controller and said second central office switching system, said second IP/call server combination comprising third and fourth groups of channel switching units, the third group of channel switching units connected to the second universal call distributor and the fourth group of channel switching units connected to the fourth universal call distributor.

21. An advanced intelligent network based information distribution and failure recovery management system according to claim 20,
wherein the first group of channel switching units communicate with the first universal call distributor of said first central office switching system, and
wherein the second group of channel switching units communicate with the third universal call distributor of said second central office switching system only when the first group of channel switching units are unable to communicate with the first universal call distributor.

22. An advanced intelligent network based information distribution and failure recovery management system according to claim 21, wherein the fourth group of channel switching units communicate with the fourth universal call distributor of said second central office switching system, and wherein the third group of channel switching units communicate with the second universal call distributor of said first central office switching system only when the fourth group of channel switching units are unable to communicate with the fourth universal call distributor.

* * * * *